(12) United States Patent
Takeda

(10) Patent No.: US 10,166,683 B2
(45) Date of Patent: Jan. 1, 2019

(54) WORKPIECE CONVEYING APPARATUS FOR A PRESSING MACHINE

(71) Applicant: AIDA ENGINEERING, LTD., Kanagawa (JP)

(72) Inventor: Keisuke Takeda, Kanagawa (JP)

(73) Assignee: Aida Engineering, Ltd., Kanagawa (JP)

( * ) Notice: Subject to any disclaimer, the term of this patent is extended or adjusted under 35 U.S.C. 154(b) by 0 days.

(21) Appl. No.: 15/455,426

(22) Filed: Mar. 10, 2017

(65) Prior Publication Data

US 2017/0259434 A1    Sep. 14, 2017

(30) Foreign Application Priority Data

Mar. 14, 2016 (JP) ................. 2016-049466

(51) Int. Cl.
  *B25J 9/00* (2006.01)
  *B25J 15/04* (2006.01)
  (Continued)

(52) U.S. Cl.
  CPC ........ *B25J 15/0491* (2013.01); *B21D 43/052* (2013.01); *B21D 43/105* (2013.01);
  (Continued)

(58) Field of Classification Search
  CPC ...... B25J 9/107; B25J 15/0061; B25J 9/0018; B21D 43/05; B21D 43/052; B21D 43/105
  See application file for complete search history.

(56) References Cited

U.S. PATENT DOCUMENTS

| | | |
|---|---|---|
| 2002/0088266 A1 | 7/2002 | Hofele et al. |
| 2013/0091920 A1* | 4/2013 | Breen .............. B21D 37/08 72/404 |
| 2016/0271678 A1 | 9/2016 | Yoshimoto |

FOREIGN PATENT DOCUMENTS

| | | |
|---|---|---|
| DE | 10 2012 016721 A1 | 2/2014 |
| JP | 4-113126 U | 10/1992 |

(Continued)

OTHER PUBLICATIONS

Extended European Search Report issued in corresponding European Patent Application No. 17160200.6, dated Aug. 11, 2017.

(Continued)

*Primary Examiner* — Saul Rodriguez
*Assistant Examiner* — Ronald P Jarrett
(74) *Attorney, Agent, or Firm* — McDermott Will & Emery LLP

(57) ABSTRACT

A workpiece conveying apparatus includes: two SCARA robots each including a first arm supported on a raising and lowering frame through intermediation of a first joint, a second arm supported through intermediation of a second joint, a first arm driving mechanism configured to drive the first arm to rotate, and a second arm driving mechanism configured to drive the second arm to rotate; a raising and lowering mechanism for the two SCARA robots; a cross arm configured to couple distal ends of the second arms; a workpiece holding unit configured to releasably hold the workpiece; shifting devices provided to the cross arm and configured to shift a drive-side shifting member; and sliding devices provided to the workpiece holding unit and configured to shift the tool holder by an operation of causing the driven-side shifting member to be driven by the drive-side shifting member.

5 Claims, 22 Drawing Sheets

(51) Int. Cl.
*B21D 43/05* (2006.01)
*B21D 43/10* (2006.01)
*B25J 9/10* (2006.01)
*B25J 15/00* (2006.01)

(52) U.S. Cl.
CPC ............. *B25J 9/009* (2013.01); *B25J 9/0018* (2013.01); *B25J 9/107* (2013.01); *B25J 15/0061* (2013.01)

(56) References Cited

FOREIGN PATENT DOCUMENTS

| JP | 2009-208080 A | 9/2009 |
| JP | 5274053 B2 | 8/2013 |
| JP | 2014-184467 A | 10/2014 |

OTHER PUBLICATIONS

Chinese Office Action issued in corresponding Chinese Patent Application No. 20170101950.7, dated Jul. 27, 2018, with English Translation.

\* cited by examiner

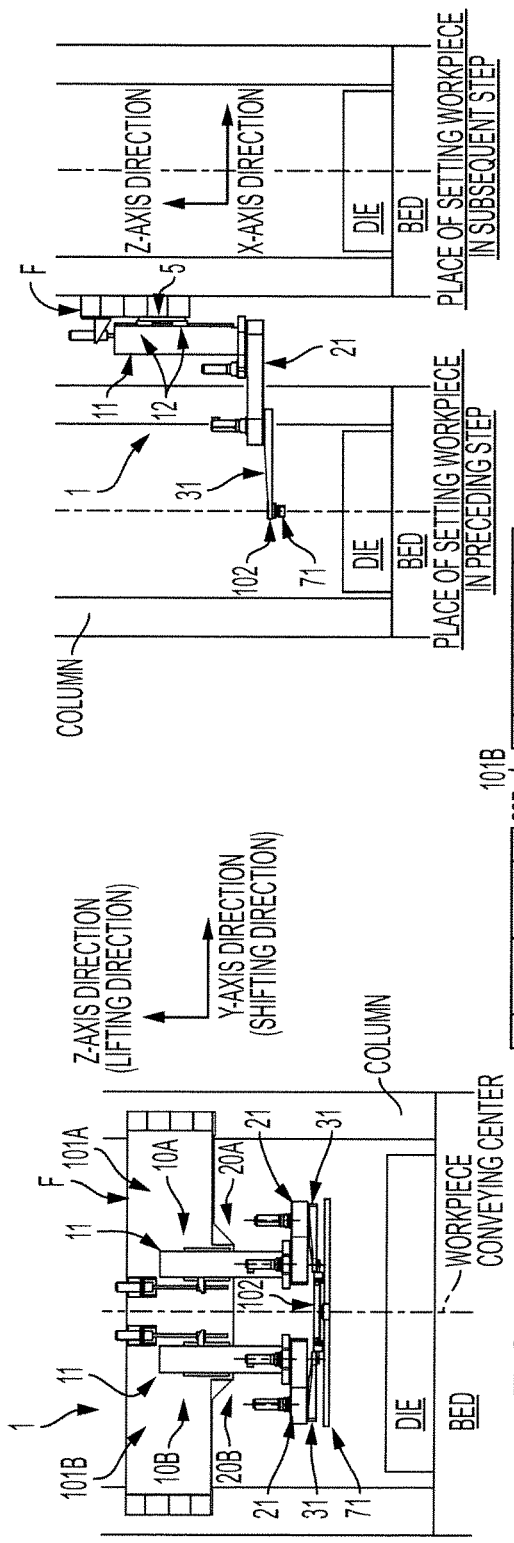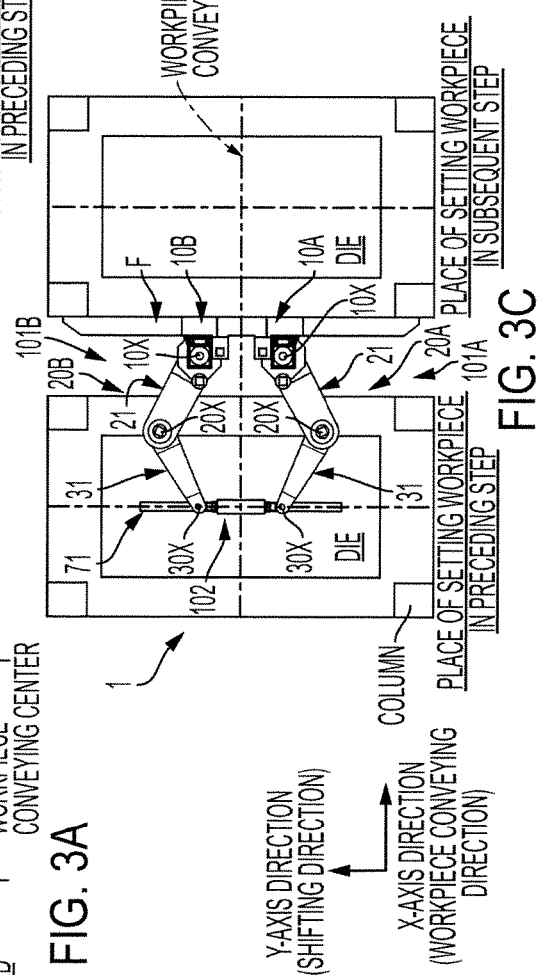

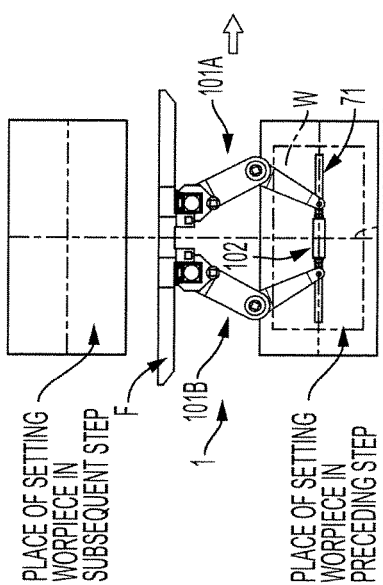
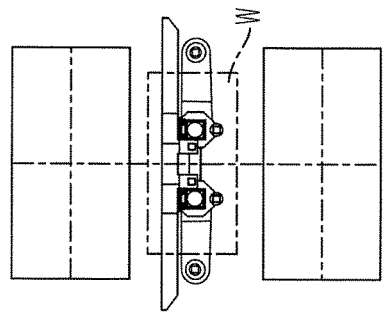 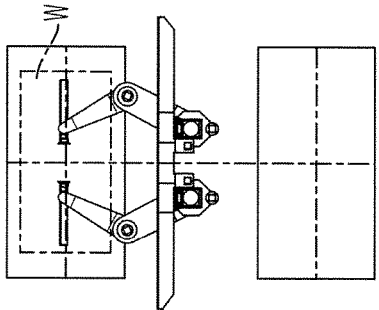
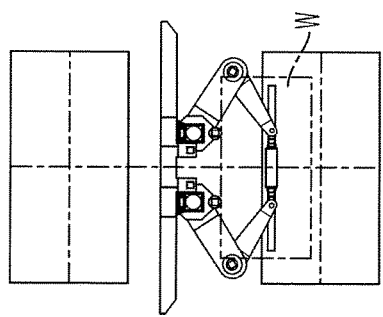 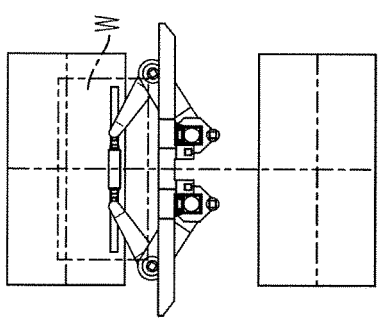

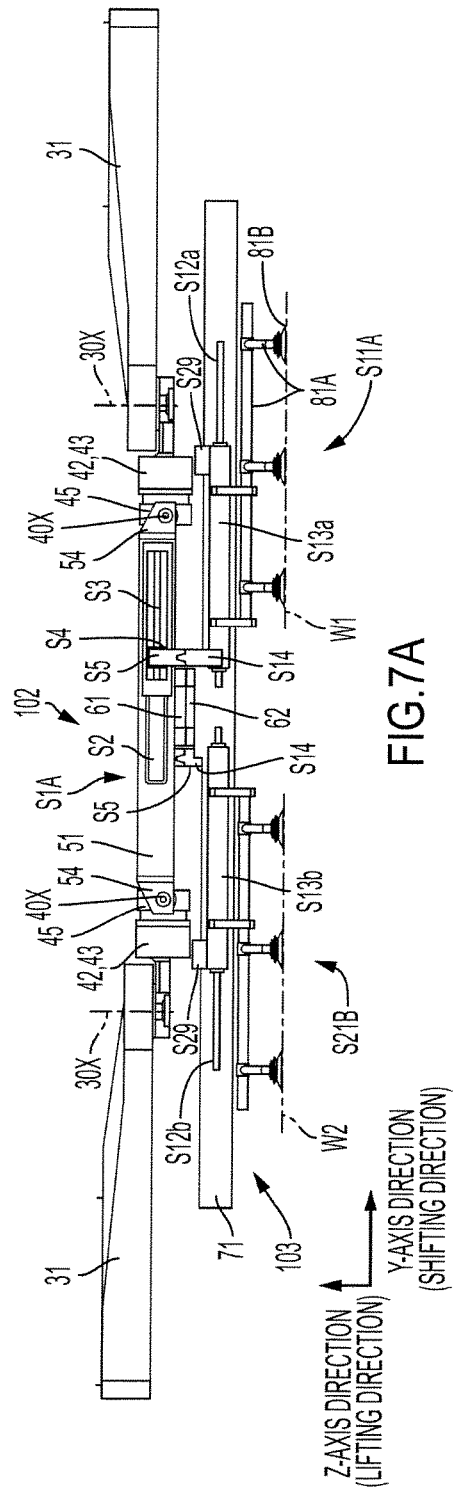
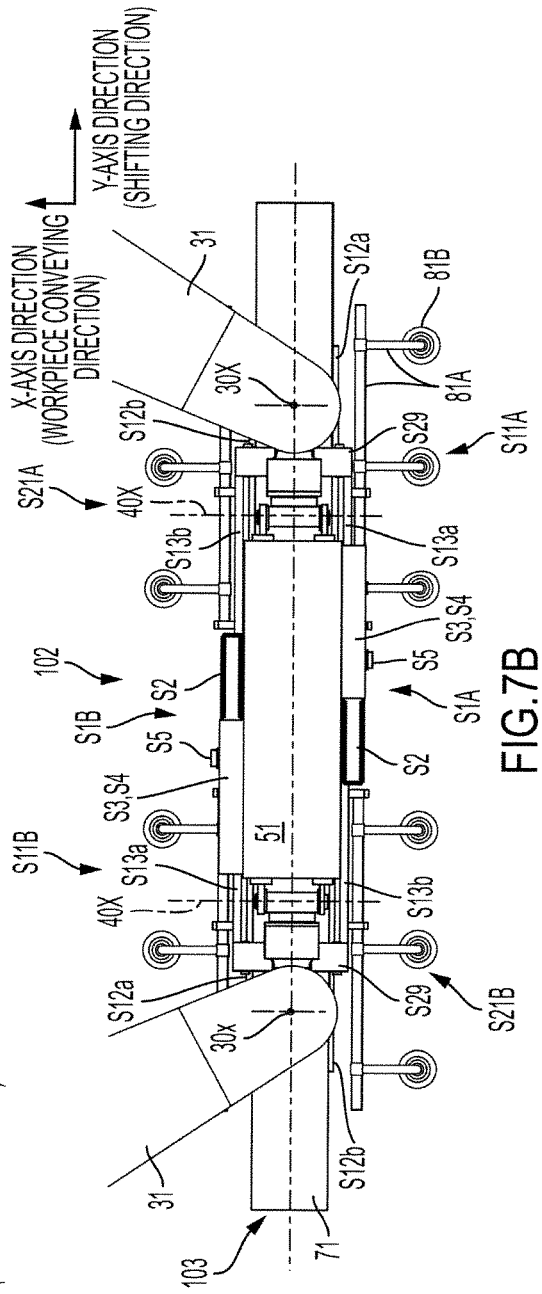

Z-AXIS DIRECTION (LIFTING DIRECTION)

Y-AXIS DIRECTION
(SHIFTING DIRECTION)

X-AXIS DIRECTION
(WORKPIECE CONVEYING DIRECTION)

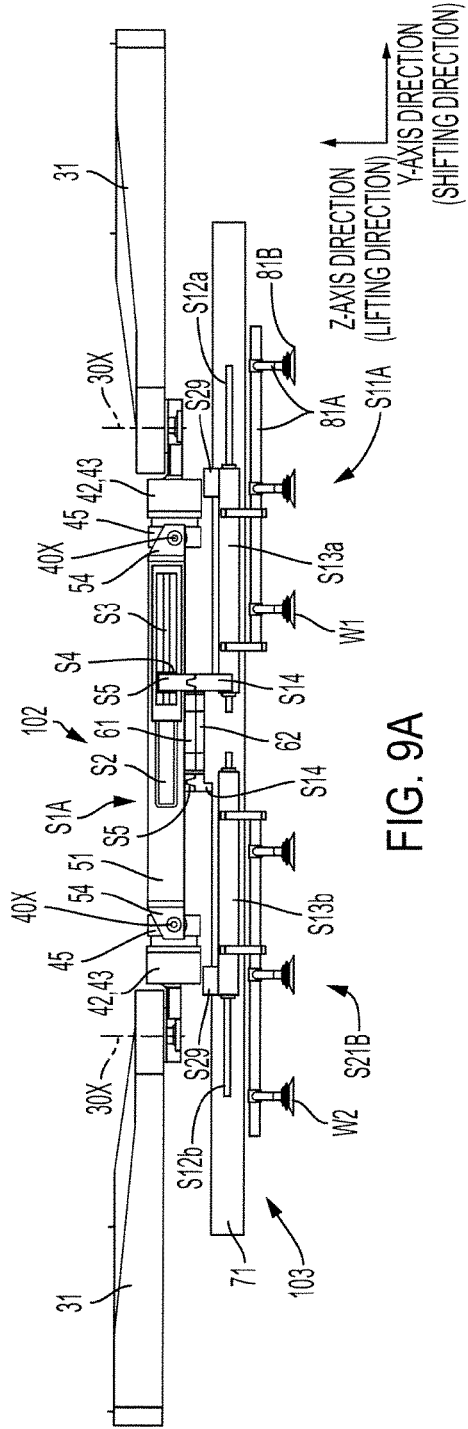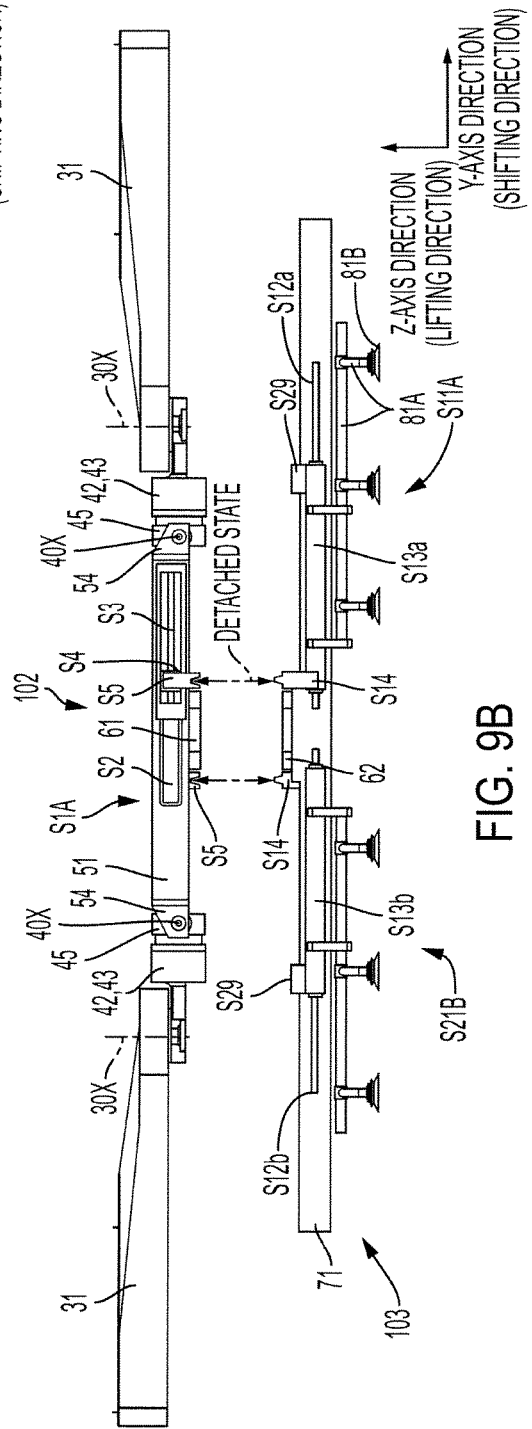
FIG. 9A
FIG. 9B

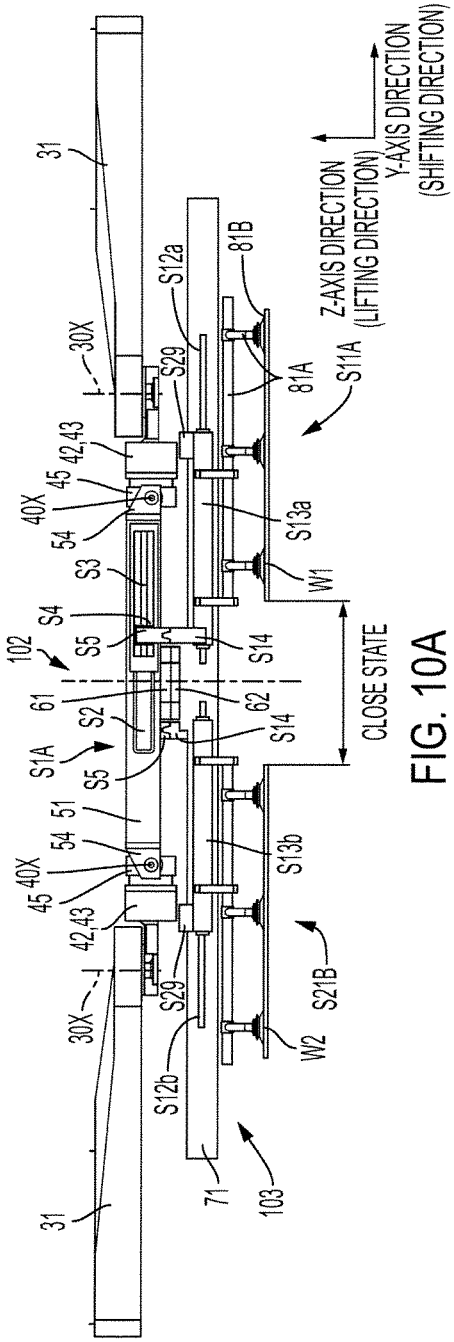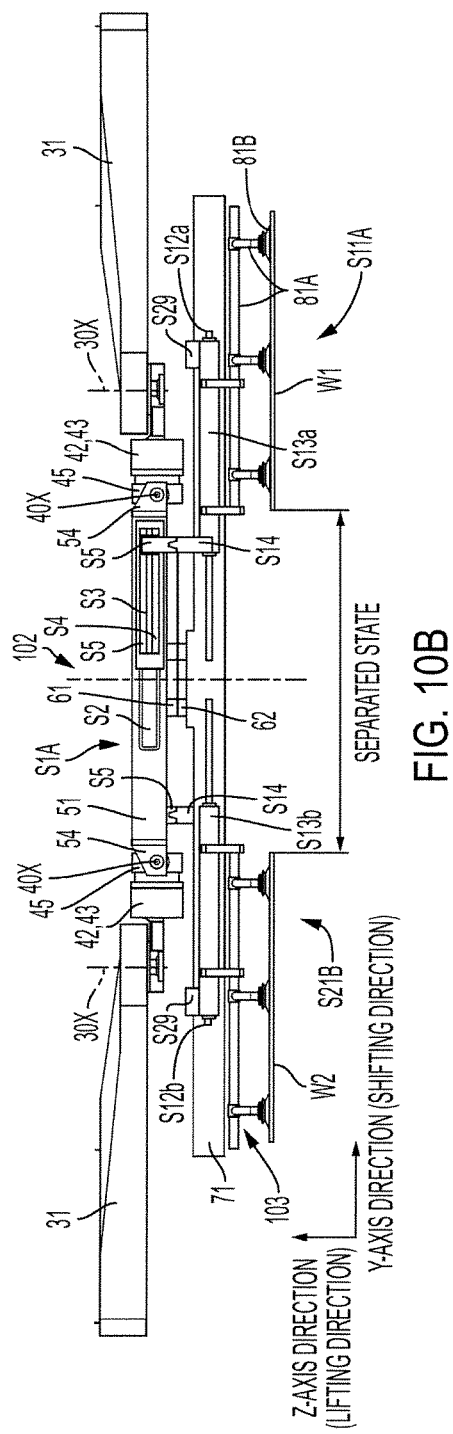

WORKPIECE CONVEYING APPARATUS FOR A PRESSING MACHINE

BACKGROUND OF THE INVENTION

1. Field of the Invention

The present invention relates to a workpiece conveying apparatus (workpiece conveying robot) for a pressing machine (press machine).

2. Description of the Related Art

Hitherto, there have been proposed various workpiece conveying apparatus configured to carry workpieces into and out of a press machine, or carry workpieces between the press machines.

In a workpiece conveying apparatus disclosed in Patent Literature 1, attachment parts are arranged at both end portions of a cross bar. For each attachment part, there are arranged a shift driving mechanism and a shift guiding mechanism. The shift driving mechanism is configured to shift the attachment part with respect to the cross bar in a longitudinal direction of the cross bar, that is, in a horizontal direction (lateral direction or Y-axis direction) substantially orthogonal to a workpiece conveying direction. The shift guiding mechanism is configured to guide the shift movement.

The shift driving mechanism disclosed in Patent Literature 1 includes a servomotor. At the time of attachment part replacement or tool replacement, it is necessary to detach a power line, that is, a drive power supply cable, and an encoder line, that is, a control-related cable from a conveying apparatus. Therefore, it is difficult to automatically perform the attachment part replacement, and the attachment part is replaced by manual work. The replacement of the attachment part by manual work takes a very long time, and production is stopped during the replacement. Thus, press production efficiency is lowered.

The attachment part including the servomotor can be automatically removed from the conveying apparatus. However, when the servomotor is removed from the conveying apparatus, position information of the shift driving mechanism is lost. Thus, when the attachment part, that is, the shift driving mechanism is to be mounted to the conveying apparatus again, it is necessary to bring a sensor or the like to a shift reference position on the conveying apparatus to perform an original point setting work. A time period required for the tool replacement can be shortened through automation of the removal work as compared to the case of manual removal work, but the original point setting work is required. Thus, there is a problem in that the total time period for the tool replacement cannot be significantly reduced.

Further, in Patent Literature 2, there is described a workpiece conveying apparatus as illustrated in FIG. 22A. The workpiece conveying apparatus can mutually independently control arm units of two selective compliance assembly robot arm robots (SCARA robots), and distal ends of the arm units of the SCARA robots are coupled to each other by slide arms.

More in detail, in Patent Literature 2, there is described the workpiece conveying apparatus, including:
a first arm unit and a second arm unit, which are rotatably supported by a base arranged at appropriate positions between a press stages and; and
a raising and lowering unit configured to raise and lower both of the arm units,
the first arm unit including a first slide arm,
the second arm unit including a second slide arm,
the first slide arm and the second slide arm being coupled to each other through intermediation of a slide mechanism so as to be slidable to have a variable mutual distance therebetween,
the first slide arm including a first workpiece grasping unit,
the second slide arm including a second workpiece grasping unit,
the first arm unit and the second arm unit being movable independently, and
the workpiece grasping units being adjustable in mutual distance therebetween in accordance with behavior of the arm units.

Herein, Patent Literature 1 corresponds to Japanese Utility Model Application Laid-open No. Hei 04-113126, and Patent Literature 2 corresponds to Japanese Patent No. 5274053.

SUMMARY OF THE INVENTION

In the workpiece conveying apparatus having the above-mentioned configuration as described in Patent Literature 2, the slide mechanism configured to have a variable mutual distance between the first slide arm and the second slide arm includes a linear guide as illustrated in FIG. 22B.

The linear guide supports a workpiece having a large weight. Thus, micromovement (deviation) in an up-and-down direction (Z-axis direction), which is caused by vibration in each of the first slide arm and the second slide arm. Thus, the linear guide receives a relatively large bending moment as well as a torsional moment, that is, a rotational moment caused by tilt driving (rotational movement about a Y-axis) (see the arrow B of FIG. 22B).

When the linear guide which receives such various large moments is increased in size to cope with those moments, the weight is also increased. Therefore, there is an actual circumstance in which distal ends of arm units of robots which support such a large linear guide become heavier, with the result that there is difficulty in high-speed and stable conveyance of a workpiece.

Further, in the workpiece conveying apparatus described in Patent Literature 2, movement of the arms in a shifting direction, or movement in the Y-axis direction cannot be structurally performed at a conveyance midpoint, that is, an intermediate position in the workpiece conveying direction under a state in which the arms are folded. Such state specifically refers to a state in which the arms on the proximal end side and the arms on the distal end side overlap with each other, in other words, a state in which the arms on the proximal end side are parallel to the Y-axis direction while the distal ends of the arms on the proximal end side are oriented outward and in which the arms on the distal end side are parallel to the Y-axis direction while the distal ends of the arms on the distal end side are oriented inward. Therefore, there is an actual circumstance in which the movement of the workpiece in the shifting direction, or the movement in the Y-axis direction is limited, with the result that suitable motion cannot be set.

According to one embodiment of the present invention, there is provided a workpiece conveying apparatus for a pressing machine, including:
two robots each including:
a raising and lowering frame supported on a stationary frame so as to be movable in a Z-axis direction being an up-and-down direction, the stationary frame being mounted to extend along a Y-axis direction that is a width direction orthogonal to an X-axis direction being a workpiece conveying direction of a passage space for conveying a workpiece;

a first arm supported at a proximal end side thereof on the raising and lowering frame through intermediation of a first joint so as to be freely rotatable within a horizontal plane;

a second arm supported at a proximal end side thereof on a distal end side of the first arm through intermediation of a second joint so as to be freely rotatable within the horizontal plane;

a first arm driving mechanism configured to drive the first arm to rotate about the first joint with respect to the raising and lowering frame; and a second arm driving mechanism configured to drive the second arm to rotate about the second joint with respect to the first arm;

a raising and lowering mechanism configured to enable the two robots to move in the Z-axis direction;

a cross arm configured to couple distal ends of second arms of the two robots so as to be freely rotatable within the horizontal plane through intermediation of a third joint;

a workpiece holding unit removably connected to the cross arm and configured to releasably hold the workpiece through intermediation of a tool holder;

a shifting device mounted to the cross arm and configured to move, by a shifting movement drive source, a drive-side shifting member along a longitudinal direction of the cross arm relative to the cross arm; and a sliding device mounted to the workpiece holding unit and configured to move, under a state in which the workpiece holding unit is connected to the cross arm, the tool holder in a Y-axis direction by an operation of causing a driven-side shifting member corresponding to the drive-side shifting member to be driven by the drive-side shifting member.

According to one embodiment of the present invention, it can be characterized in that the tool holder includes a plurality of tool holders arranged along the Y-axis direction, that the sliding device includes a plurality of sliding devices provided so as to correspond to the plurality of tool holders, respectively, and that the shifting device includes a plurality of shifting devices provided so as to correspond to the plurality of sliding devices, respectively.

According to one embodiment of the present invention, it can be characterized in that a workpiece conveying apparatus for a pressing machine further includes a shifting direction positioning mechanism configured to hold a relative position of the tool holder with respect to the workpiece holding unit at a predetermined position when the workpiece holding unit is detached from the cross arm.

BRIEF DESCRIPTION OF THE DRAWINGS

FIG. 3A is a front view for illustrating the overall configuration of the workpiece conveying apparatus according to the embodiment.

FIG. 3B is a right side view of FIG. 3A.

FIG. 3C is a plan view of FIG. 3B.

FIG. 4A, FIG. 4B, FIG. 4C, FIG. 4D, and FIG. 4E are plan views for illustrating, in a stepwise manner, states in which the workpiece conveying apparatus according to the embodiment conveys a workpiece W.

FIG. 7A is an enlarged front view for illustrating a center arm and a cross bar unit (a shifting device and a sliding device) of the workpiece conveying apparatus according to the embodiment.

FIG. 7B is a plan view of FIG. 7A.

FIG. 9A is an enlarged front view for illustrating the coupling (connecting or attaching) state between the center arm and the cross bar unit of the workpiece conveying apparatus according to the embodiment.

FIG. 9B is a front view for illustrating the state in which the cross bar unit is detached (or dismounted) from the cross arm.

FIG. 10A is a front view for illustrating a state in which tool holders, which are aligned in a shifting direction of the center arm and the cross bar unit (shifting device and sliding device) of the workpiece conveying apparatus according to the embodiment, approach to each other.

FIG. 10B is a front view for illustrating a state in which the tool holders are separated from each other.

DESCRIPTION OF THE EMBODIMENTS

Figure 1:
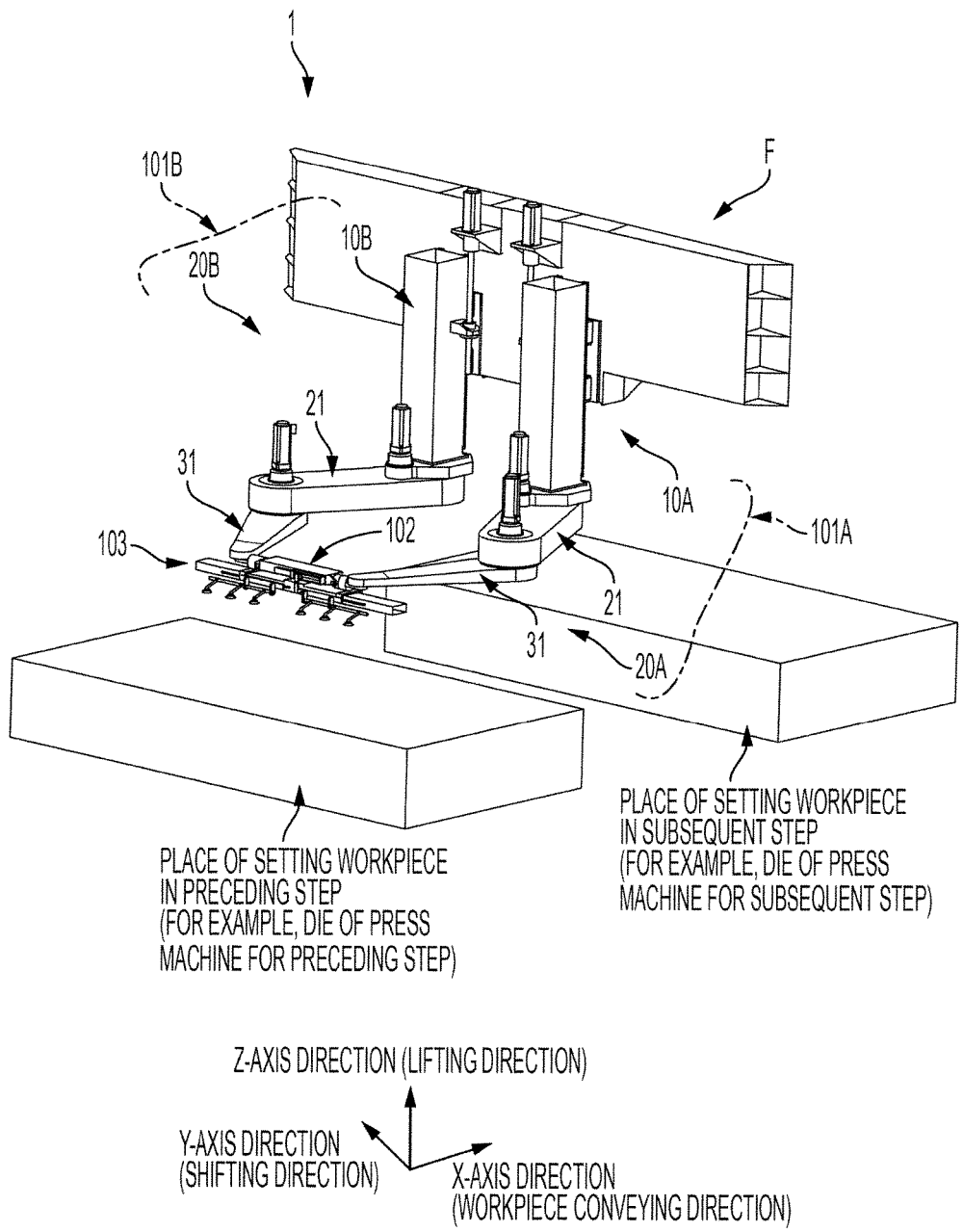
FIG. 1 is a perspective view for illustrating an overall configuration of a workpiece conveying apparatus according to one embodiment of the present invention.
Figure 2A:
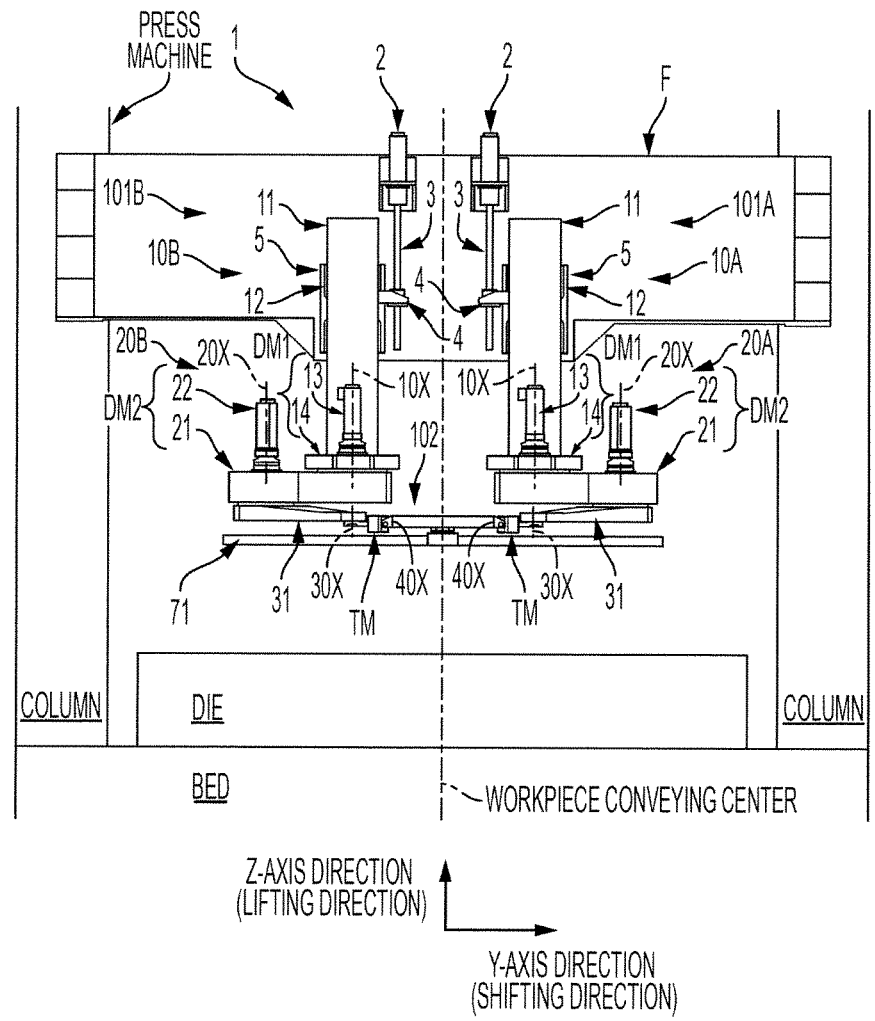
FIG. 2A is a front view for illustrating the overall configuration of the workpiece conveying apparatus according to the embodiment as viewed from an upstream in a workpiece conveying direction.
Figure 2B:
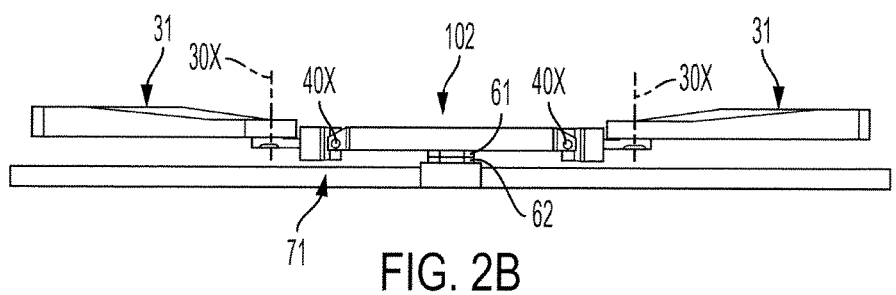
FIG. 2B is an enlarged front view for illustrating second arms, a cross arm, and a cross bar of FIG. 2A.

Now, with reference to the accompanying drawings, description is made of a workpiece conveying apparatus for a pressing machine according to an exemplary embodiment of the present invention. The present invention is not limited to the embodiment described below.

The present invention has been made in view of the above-mentioned circumstances, and has an object to provide a workpiece conveying apparatus for a pressing machine capable of, with a relatively simple, low-cost, lightweight, and compact configuration, changing a conveyance posture, that is, a posture during conveyance, specifically during a shifting movement in a Y-axis direction of the workpiece with a high degree of freedom.

Herein, a center in a width direction orthogonal to a workpiece conveying direction of a passage space for conveying a workpiece is referred to as a workpiece conveying center.

The workpiece conveying apparatus for a pressing machine according to this embodiment can be used not only for carrying a workpiece into and out of a press machine, but also for conveying the workpiece between a plurality of press machines arranged on a press line from an upstream step to a downstream step. Therefore, the workpiece includes a plate-like metal member as a raw workpiece, and a finished product formed after press forming. When the workpiece is subjected to press working by the plurality of press machines, the workpiece also includes an unfinished product, and a plurality of divided pieces of a plate-like metal member formed after press working.

As illustrated in FIG. 1 to FIG. 5, a workpiece conveying apparatus 1 for a pressing machine according to this embodiment includes:

two robots (SCARA robots) 101A and 101B respectively including arm units 20A and 20B each including two arms (a first arm 21 and a second arm 31), the two robots being supported on a stationary frame F so as to be movable in an up-and-down direction (Z-axis direction), the stationary frame F being stationarily mounted to a press line (press machine) along a width direction (lateral direction or a Y-axis direction) orthogonal to a workpiece conveying direction;

raising and lowering mechanisms 10A and 10B configured to raise and lower the two robots 101A and 101B with respect to the stationary frame F, respectively and independently of each other, that is, mutually independently;

one (common) cross arm 102 connected to a distal end of the second arm 31 of each of the two arm units 20A and 20B; and a cross bar unit 103 connected to the cross arm 102.

In FIG. 1, reference numeral 150 indicates a place of setting a workpiece, such as a die of a press machine for a preceding step, and reference numeral 152 indicates a place of setting a workpiece, such as a die of another press machine for a subsequent step.

With respect to a vertical plane (XZ plane) passing a workpiece conveying center, the robot (SCARA robot) 101A is arranged to be substantially symmetrical, that is, planar symmetrical with the robot (SCARA robot) 101B.

The raising and lowering mechanism 10A (10B), which is configured to raise and lower the robot 101A (101B), that is, to move the robot 101A (101B) in the Z-axis direction, includes a servomotor 2, a ball screw 3, a ball screw nut (screw) 4, and a linear guide rail 5. A raising and lowering frame 11 of the robot 101A (101B) is connected to the ball screw nut 4 that is raised and lowered (or moved up and down) along the ball screw 3 arranged substantially upright, that is, arranged to extend in the Z-axis direction.

When the ball screw 3 is rotated by a driving force of the servomotor 2, the ball screw nut 4 threadedly engaged with the ball screw 3 is raised and lowered. In this manner, the robot 101A (101B) connected to the ball screw nut 4 through intermediation of the raising and lowering frame 11 can be raised and lowered in the up-and-down direction, that is, the Z-axis direction.

One servomotor 2 is arranged for each of the robots 101A and 101B in order to raise and lower each of the robots 101A and 101B. Typically, servomotors 2 are driven in synchronization so as to move the robot 101A (101B) from the same position, at the same timing, in the same direction, at the same speed, and by the same distance, thereby raising and lowering the robots 101A and 101B in the Z-axis direction in synchronization.

Further, in this embodiment, the servomotors 2 can mutually independently be driven. Thus, the robots 101A and 101B can mutually independently be raised and lowered in the Z-axis direction.

Here, the two robots 101A and 101B include the corresponding arm units 20A and 20B, respectively. The arm unit 20A (20B) includes:

the first arm 21 supported on the raising and lowering frame 11 through intermediation of a first joint 10X corresponding to a vertical axis or a Z-axis so as to be freely rotatable within a horizontal plane, that is, within the XY plane;

the second arm 31 supported on a distal end of the first arm 21 through intermediation of a second joint 20X corresponding to the vertical axis or the Z-axis so as to be freely rotatable (hereinafter, the term "rotatable" also encompasses turnable and pivotable) within the horizontal plane, that is, within the XY plane;

the cross arm 102 coupled to the distal ends of the second arms 31 of the arm units 20A and 20B so as to be freely rotatable within the horizontal plane, that is, within the XY plane through intermediation of a third joint 30X;

a first arm driving mechanism DM1, which includes a servomotor 13 and a speed reducer 14, configured to drive the first arm 21 to rotate about the first joint 10X with respect to the raising and lowering frame 11; and a second arm driving mechanism DM2, which includes a servomotor 22 and a speed reducer 23, configured to drive the second arm 31 to rotate about the second joint 20X with respect to the first arm 21.

The cross arm 102 is connected to (or pivotally supported on) the distal end of the second arm 31 of each of the robots 101A and 101B through intermediation of a bearing 32 so as to be rotatable about the third joint 30X.

Through drive and control of the arm units 20A and 20B of the two robots 101A and 101B in synchronization with each other, the two robots 101A and 101B are caused to move symmetrically, that is, planer symmetrically with respect to the vertical plane passing the workpiece conveying center, that is, with respect to the XZ plane. For example, the servomotors 13 and 22 respectively rotate the first arm 21 and the second arm 31 about the respective joints. In this manner, the cross arm 102 and a workpiece W are moved (or conveyed) in the workpiece conveying direction which is the X-axis direction (see FIG. 4A to FIG. 4E).

Further, the arm units 20A and 20B of the two robots 101A and 101B are driven not in synchronization with each other, and an arm angle of each of the first arm 21 and the second arm 31, specifically, a rotating amount about the joint is controlled. Thus, the robots 101A and 101B can perform an operation of moving the workpiece in a shifting direction, which is the Y-axis direction (see FIG. 19), and can perform an operation of rotating the workpiece about the Z-axis (see FIG. 20).

As described above, the servomotors 2, which are arranged to correspond to the robots 101A and 101B, respectively, can mutually independently be driven and controlled, and can mutually independently raise and lower the robots 101A and 101B. Typically, in order to raise and lower the robots 101A and 101B, that is, in order to move the robots 101A and 101B in the Z-axis direction, the two servomotors 2 perform raising and lowering operations in synchronization with each other. However, when the two servomotors 2 are operated at different speeds, the two servomotors 2 can not only merely raise and lower the robots 101A and 101B, but also shift positions of the right and left robots 101A and 101B in the Z-axis direction, which is a height direction. Further, the two servomotors 2 can incline the cross arm 102, the cross bar unit 103, and the workpiece W held (or grasped or supported) by the cross bar unit 103 about an X-axis within a YZ plane (see FIG. 21).

Here, in this embodiment, only the cross arm 102, the cross bar unit 103, and the workpiece W held by the cross bar unit 103 can be inclined (or rolled) about the X-axis within the YZ plane. Accordingly, as compared to a case where the entire arm units are inclined as in the workpiece conveying apparatus described in Japanese Patent No. 5274053, rotational energy can be reduced. Thus, a size of a driving motor can be reduced, thereby being capable of achieving reduction in weight and size of the apparatus.

In addition, in this embodiment, only the cross arm 102 having a relatively small length, the cross bar unit 103, and the workpiece W held by the cross bar unit 103 are inclined. Accordingly, as compared to a case where the entire arm units each having a large length are inclined as in the workpiece conveying apparatus described in Japanese Patent No. 5274053, interference with another component is less liable to occur. Therefore, a large inclination angle (rolling angle) can be taken.

The cross arm 102 includes a center arm 51, and two holders 45 respectively arranged at both ends of the center arm 51 and respectively connected to the distal ends of the second arms 31 of the robots 101A and 101B. Each of the holders 45 and the center arm 51 are connected to each other through intermediation of a bearing 54, which is freely rotatable about a fourth joint 40X (X-axis), so as to be rotatable in the up-and-down direction, that is, within the YZ plane.

With this configuration, when the right and left robots 101A and 101B are raised and lowered to different positions, specifically, positions in the Z-axis direction or the height direction, the center arm 51 is inclined. Thus, the cross bar unit 103 connected to the center arm 51, and the workpiece W can be inclined (see FIG. 21).

Further, the bearing 54, which couples the center arm 51 and each of the holders 45 together at one end of the cross arm 102, is linearly movable by a minute distance along a longitudinal direction of the cross arm 102 with respect to the center arm 51 (or each of the holders 45). With this configuration, stress applied on a machine due to errors of control of the right and left arm units 20A and 20B can be mitigated.

In addition, in this embodiment, a tilting mechanism TM is arranged between the distal end of the second arm 31 and the holder 45 mounted at each end of the cross arm 102.

Figure 6:
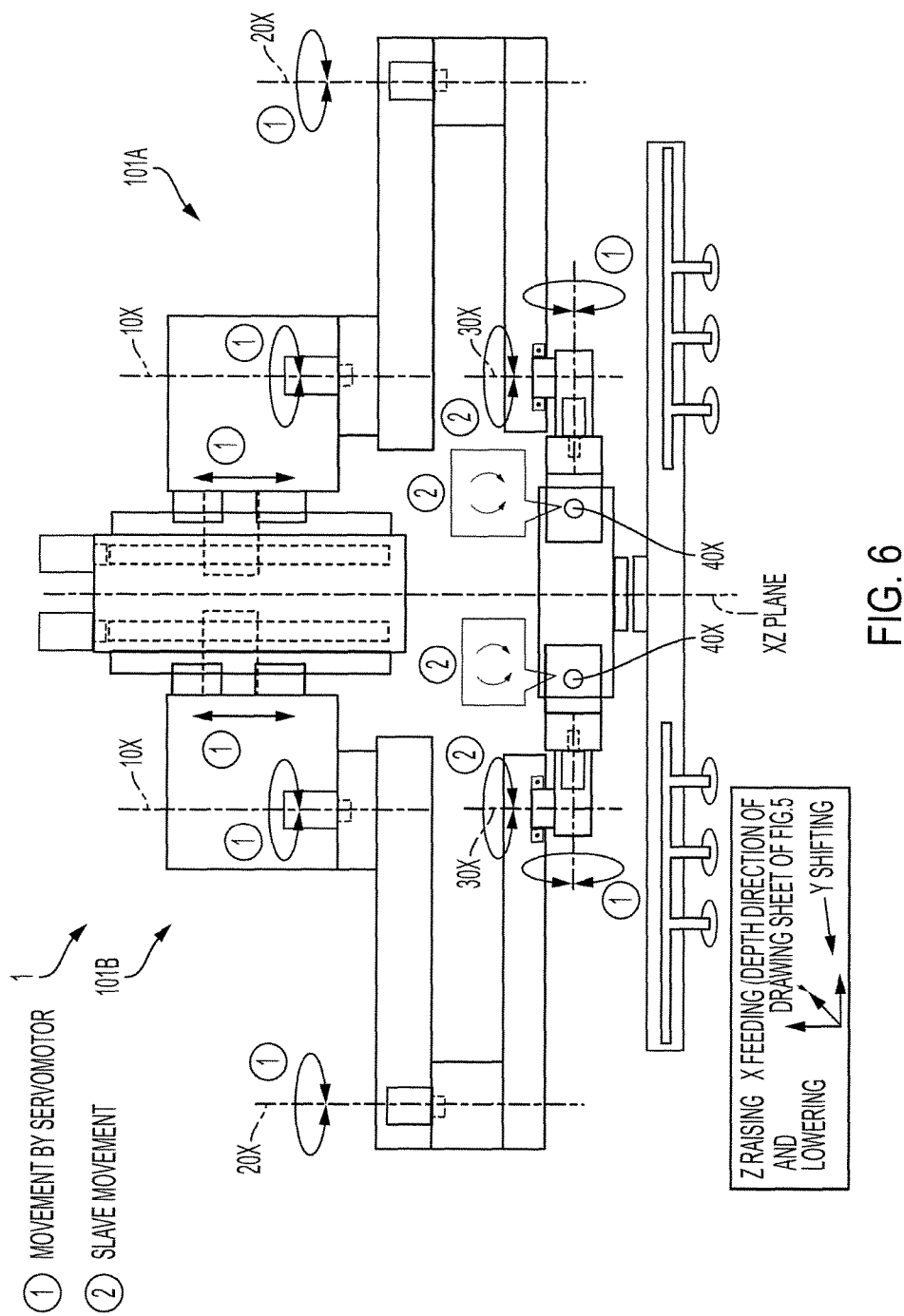
FIG. 6 is a front view for illustrating directions of movement and types of the movement (movement by a servomotor and slave movement) of movable components in the configuration example of the workpiece conveying apparatus according to the embodiment illustrated in FIG. 5.

The tilting mechanism TM includes a bracket 41 coupled to the second arm 31 through intermediation of the third joint 30X, a servomotor 42, and a speed reducer 43. The tilting mechanism TM can rotate (or tilt) the center arm 51 about a Y-axis which is a shifting axis, that is, about a rotation axis parallel to a longitudinal direction of the center arm 51 with respect to the bracket 41 and the second arm 31 (see FIG. 6).

However, the tilting mechanism TM may be arranged on the cross bar unit 103 side, and may rotate (or tilt) a cross bar 71 about the rotation axis parallel to a longitudinal direction of the cross bar 71.

Figure 8A:
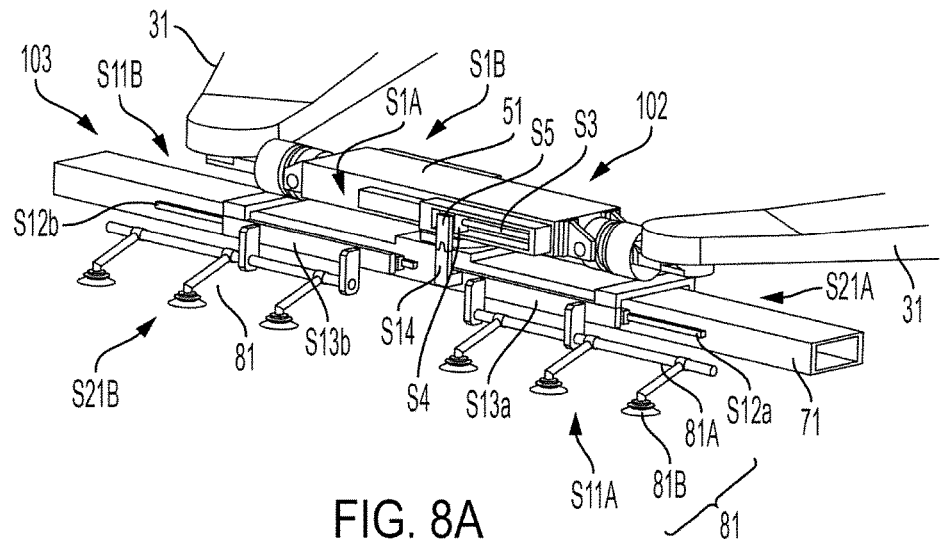
FIG. 8A is an enlarged perspective view for illustrating a coupling (connecting or attaching) state between the center arm and the cross bar unit of the workpiece conveying apparatus according to the embodiment.
Figure 8B:
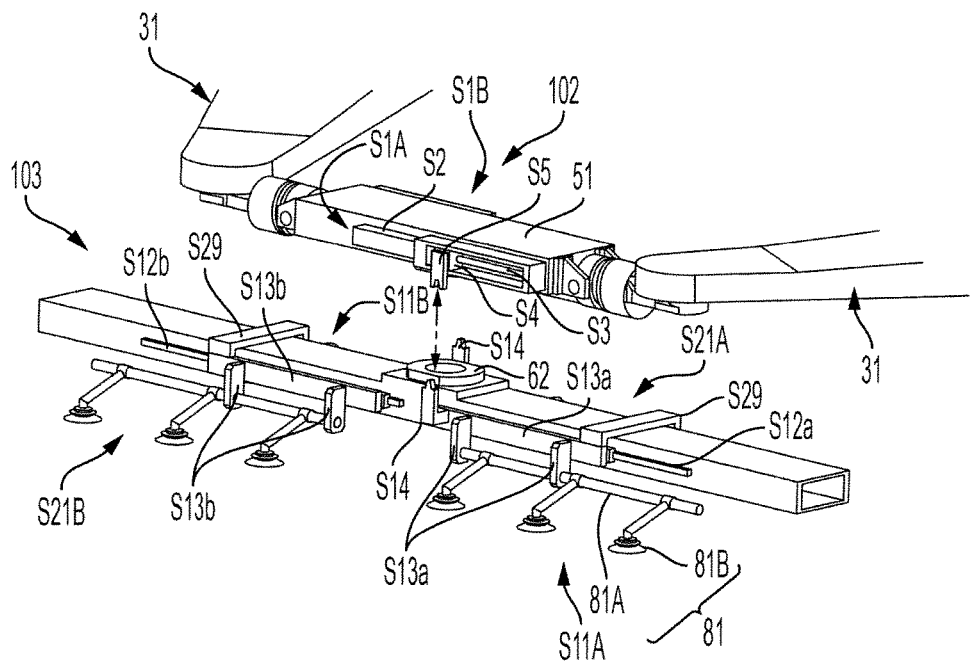
FIG. 8B is a perspective view for illustrating a state in which the cross bar unit is detached (or dismounted) from the cross arm.

Couplers 61 and 62 removably connect the cross bar unit 103 to a lower center portion of the center arm 51 of the cross arm 102 (see FIG. 8 and FIG. 9). As each of the couplers 61 and 62, there can be adopted, for example, a quick changer (tool changer), which is manufactured by BL AUTOTEC, Ltd. and readily and commercially available.

The cross bar unit 103 includes a bar-like cross bar 71 elongated in a direction orthogonal to the workpiece conveying direction, specifically, the Y-axis direction or the shifting direction, and grasping (holding) tools 81. Each of the grasping tools 81 includes spiders (pipe-like elements) 81A, suction cups 81B, and the like. Each of the grasping tools 81 has such a configuration that the suction cups 81B can draw and hold workpieces W1 and W2, and can release the drawn and held workpieces W1 and W2.

Herein, in the cross arm 102 of the workpiece conveying apparatus 1 according to this embodiment, there are provided (or mounted) two shifting devices S1A and S1B, as illustrated in FIG. 7A, FIG. 7B, FIG. 8A, and FIG. 8B.

The shifting device S1A and the shifting device S1B have the same configuration. Each of the shifting devices S1A and SIB includes a servomotor S2 being a shifting movement drive source, a ball screw S3, a linear guide S4, and a drive-side shifting member S5.

The ball screw S3 is arranged along the longitudinal direction, that is, the Y-axis direction of the cross arm 102 and is rotated integrally with an output rotary shaft of the servomotor S2. The drive-side shifting member S5 screwed onto an outer circumferential thread portion of the ball screw S3 is configured to be movable (or reciprocable) along the longitudinal direction, that is, the Y-axis direction of the ball screw S3 by rotation, specifically, a forward rotation or a reverse rotation of the servomotor S2 and the ball screw S3. Further, the linear guide S4 is engaged with the drive-side shifting member S5 so as to rectilinearly guide the movement of the drive-side shifting member S5 along the longitudinal direction, that is, the Y-axis direction of the ball screw S3.

With this configuration, the drive-side shifting member S5 of the shifting device S1A (S1B) according to this embodiment can be moved to an appropriate position in the longitudinal direction, that is, the Y-axis direction of the cross arm 102, and can be stopped and maintained (or positioned) at that position.

A lower end portion of the drive-side shifting member S5 has a recessed shape (or a protruding shape), and is engageable with a driven-side (slave-side) shifting member (pin) S14 having an upper end portion which has a protruding shape (or a recessed shape) in conformity with the shape of the lower end portion of the drive-side shifting member S5. Therefore, when the lower end portion of the drive-side shifting member S5 and the upper end portion of the driven-side shifting member S14 approach to each other in the up-and-down direction (Z-axis direction) to be engaged (see FIG. 8A and FIG. 9A), the driven-side shifting member S14 is driven substantially integrally with the shifting movement by the shifting device S1A (S1B) in the shifting direction (Y-axis direction) of the drive-side shifting member S5 to be shifted (or slid) in the shifting direction (Y-axis direction) which is the same as the shifting direction of the drive-side shifting member S5.

The driven-side shifting member S14 is a component of the sliding device S11A (S11B), and the sliding device S11A (S11B) is mounted (or provided) on the cross bar unit 103 side so as to correspond to the shifting device S1A (S1B).

Each of the sliding devices S11A and S11B includes a linear guide S12a, a tool holder S13a, and the driven-side shifting member S14.

Further, on sides opposite to the sliding devices S11A and S11B over a longitudinal direction center axis of the crossbar 71 (a center of the cross bar 71 in the workpiece conveying direction (X-direction)), there are arranged slave-side sliding devices S21A and S21B. Each of the slave-side sliding devices S21A and S21B includes a linear guide S12b and a tool holder S13b.

The tool holder S13b of the slave-side sliding device S21A (S21B) is substantially integrally connected to the tool holder S13a of the sliding device S11A (S11B) through intermediation of a bridge (connection member) S29. The tool holder S13b is configured to be movable in the same direction as the moving direction of the tool holder S13a along a cross bar longitudinal direction (Y-axis direction) while being rectilinearly guided by the linear guide S12b in conjunction with the tool holder S13a (or driven by the tool holder S13a).

Therefore, when the driven-side shifting member S14 is shifted (or slid) in the shifting direction (Y-axis direction) in conjunction with the shifting movement of the drive-side shifting member S5 in the shifting direction (Y-axis direction) by the shifting device S1A (S1B), the tool holder S13a, which is substantially integral with the driven-side shifting member S14, as well as the tool holder S13b connected through intermediation of the bridge (connection member) S29 are moved in conjunction with each other in the same direction along the cross bar longitudinal direction (Y-axis direction).

The sliding device S11A and the slave-side sliding device S21A are arranged at positions in point symmetry with respect to the sliding device SUB and the slave-side sliding device S21B over a center point, that is, a center of the cross arm 102 illustrated in FIG. 7B. With such arrangement, the weight balance of the shifting movement drive sources, that is, servomotors S2 being heavy objects is maintained. However, the arrangement of the sliding device S11A and the slave-side sliding device S21A is not limited to the above-mentioned arrangement, and another arrangement can also be employed through, for example, a method of increasing the number of servomotors, that is, a method of arranging another servomotor to be replaced with the driven-side for independent driving, a method of mounting a balancer, or other method.

Further, as illustrated in FIG. 7A, FIG. 7B, FIG. 8A, and FIG. 8B, the grasping tools 81, which are configured to grasp (hold or support) a workpiece, are mounted to the tool holders S13a and S13b, respectively. As described above, each of the grasping tools 81 includes the spiders (pipe-like elements) 81A, the suction cups 81B, and the like, and has a configuration in which the suction cups 81B can draw and hold the workpiece, and can release the drawn and held workpiece.

When driving of the servomotors S2 of the two shifting devices S1A and S1B are controlled independently to shift the drive-side shifting members S5 in the shifting direction (Y-axis direction), the driven-side shifting members S14 are driven in conjunction with the driving to shift (or slide) in the shifting direction (Y-axis direction), and the bridges (connection members) S29, the tool holders S13a and S13b, the workpiece holding tools 81, and the workpieces W1 and W2 are moved to appropriate positions along the cross bar longitudinal direction (Y-axis direction).

When the servomotors S2 of the two shifting devices S1A and S1B are controlled mutually independently, the shifting directions (moving directions) of the drive-side shifting members S5 of the two shifting devices S1A and S1B can be set to the same direction (the same phase). Further, as illustrated in FIG. 10A and FIG. 10B, when the shifting directions are set to the reverse directions (reverse phases), that is, directions of approaching to each other or separating from each other, the mutual distance between the workpieces W1 and W2 can be changed. Further, only one of the servomotors S2 of the two shifting devices S1A and S1B can be driven so that, while maintaining a position of one drive-side shifting member S5 (one of the workpieces W1 and W2), a position of another drive-side shifting member S5 (another one of the workpieces W1 and W2) can approach to or be separated from the one drive-side shifting member S5 (the one of the workpieces W1 and W2).

As described above, with the workpiece conveying apparatus 1 according to this embodiment, there can be provided a workpiece conveying apparatus for a pressing machine capable of changing a conveyance posture of a workpiece, or a posture during conveyance, in particular, the shifting movement of the workpiece in the Y-axis direction, with a high degree of freedom while achieving a relatively simple, low-cost, lightweight, and compact configuration.

Further, in the workpiece conveying apparatus 1 according to this embodiment, improvement has been made so that the servomotors S2 being the shifting mechanism drive sources (servomotors) can be provided to the workpiece conveying apparatus 1 (cross arm 102) side. Thus, at the time of tool replacement, there is no need to separate the tool attachment part, which includes the shifting mechanism servomotor as in the related-art apparatus (Japanese Utility Model Application Laid-open No. Hei 4-113126), from the workpiece conveying apparatus, and hence the supply of power to the shifting mechanism servomotors corresponding to the servomotors S2 is continued. Thus, there is no fear in that the position information of the servomotors for the shifting mechanism, for example, servomotors, is lost at each time of the tool replacement as in the related-art apparatus (Japanese Utility Model Application Laid-open No. Hei 4-113126), and there is no need to perform the original point setting work at the time of reconnection, thereby being capable of significantly reducing the time for tool replacement.

Further, in this embodiment, description is made of the case where the servomotor S2 is used as the shifting movement drive source, but the shifting movement drive source is not limited thereto. An electric motor or a linear motor other than the servomotor may also be used as the shifting movement drive source.

Now, description is made of an operation of replacing the cross bar unit of the workpiece conveying apparatus 1 according to this embodiment.

<Cross Bar Mounting and Dismounting Operation (Tool Replacement)>

(Step A)

Figure 11:
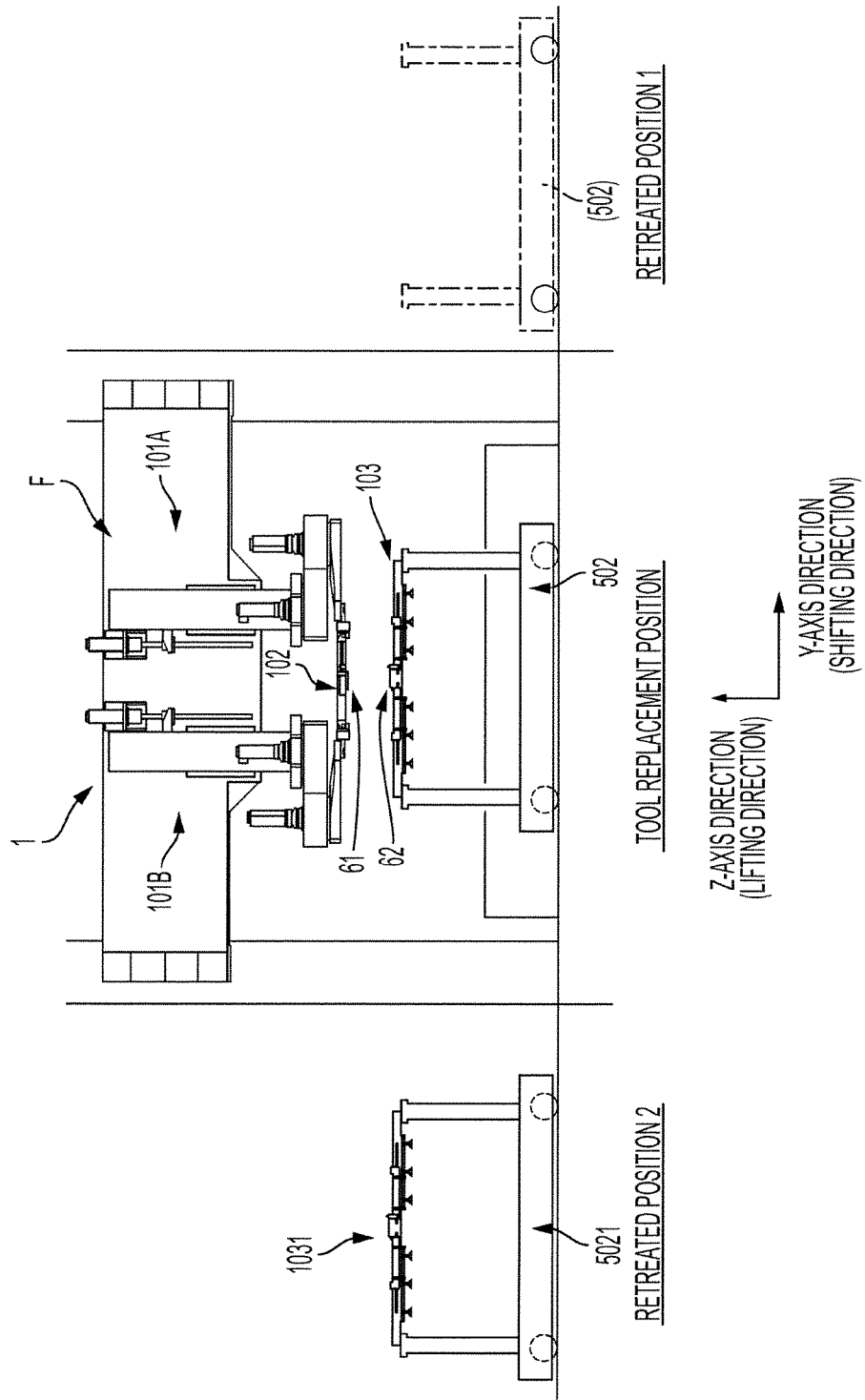
FIG. 11 is an explanatory front view for illustrating a tool replacement movement (movement of an empty center arm to take the cross bar unit) in the workpiece conveying apparatus according to the embodiment.

A carrier 502 which carries a cross bar unit 103 to be used next (this time) is moved from a retreated position 1 of FIG. 11 to a tool replacement position of FIG. 11. Further, under a state in which a cross bar unit 1031 having been used previously (at previous time) is already removed (empty state), the workpiece conveying apparatus 1 (the cross arm 102) is moved to a tool replacement position (see FIG. 11).

As illustrated in FIG. 11, the cross bar unit 1031 having been used previously is automatically detached (dismounted or removed) from the workpiece conveying apparatus 1 at the tool replacement position of FIG. 11 and mounted to another carrier 5021, and thereafter moved to the retreated position 2 of FIG. 11.

(Step B)

Figure 12:
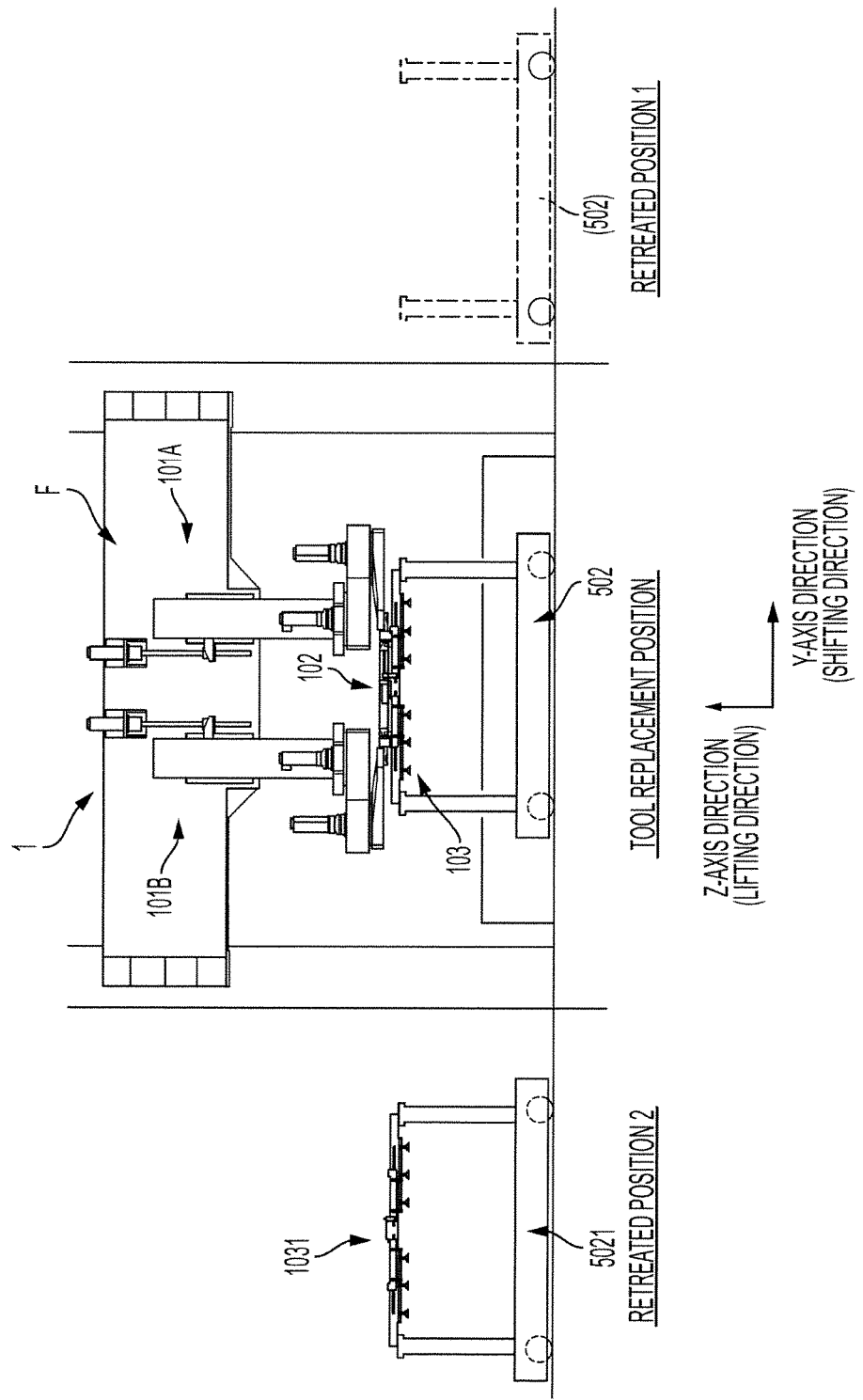
FIG. 12 is an explanatory front view for illustrating the tool replacement movement (movement of a center arm to be close contact with the cross bar unit) in the workpiece conveying apparatus according to the embodiment.

From the state of FIG. 11, the cross arm 102 of the workpiece conveying apparatus 1 is lowered to bring a coupler 61 on the cross arm 102 side to be in close contact with a coupler 62 on the next cross bar unit 103 side (see FIG. 12).

At this time, through the lowering movement of the workpiece conveying apparatus 1 (the cross arm 102), the drive-side shifting members S5 and the driven-side shifting members S14 are engaged with each other (see FIG. 8A, FIG. 8B, FIG. 10A, and FIG. 10B).

Further, the coupler 61 of the cross arm 102 and the coupler 62 of the cross bar unit 103 are engaged through the lowering movement of the workpiece conveying apparatus 1 (cross arm 102), and supply of air from the coupler 61 side to the coupler 62 side is started so that the coupler 61 and the coupler 62 are automatically chucked (or attached).

(Step C)

Figure 13:
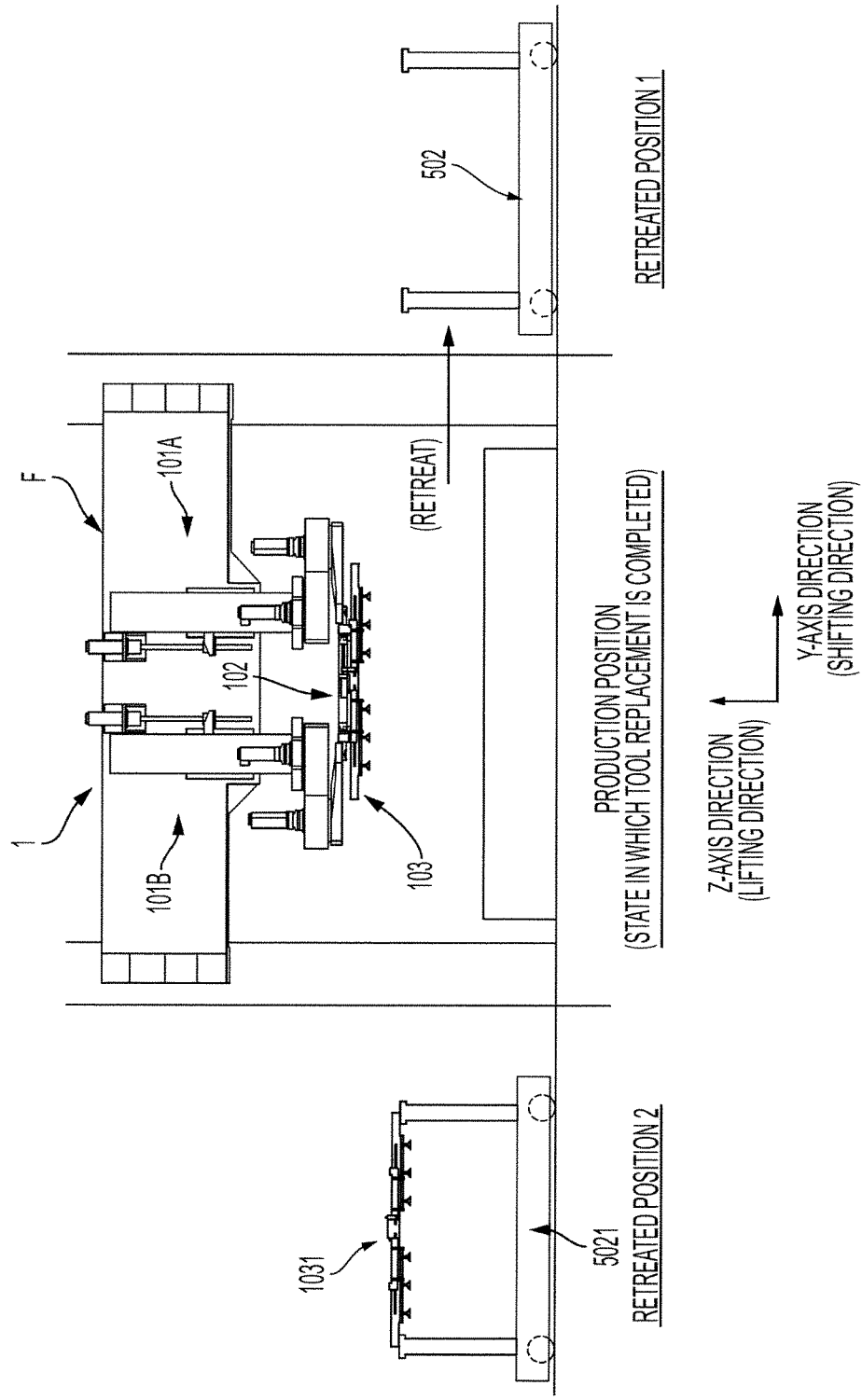
FIG. 13 is a front view for illustrating a state in which the tool replacement is completed in the workpiece conveying apparatus according to the embodiment.

Next, when the cross arm 102 of the workpiece conveying apparatus 1 is raised, the engagement between the coupler 61 on the cross arm 102 side and the coupler 62 on the next cross bar unit 103 side causes the next cross bar unit 103 to be detached from the carrier 502. The workpiece conveying apparatus 1 carries the next cross bar unit 103 and moves to a predetermined production position, and the carrier 502 is returned to the retreated position 1. Then, press working (or production) is started (see FIG. 13).

Figure 14:
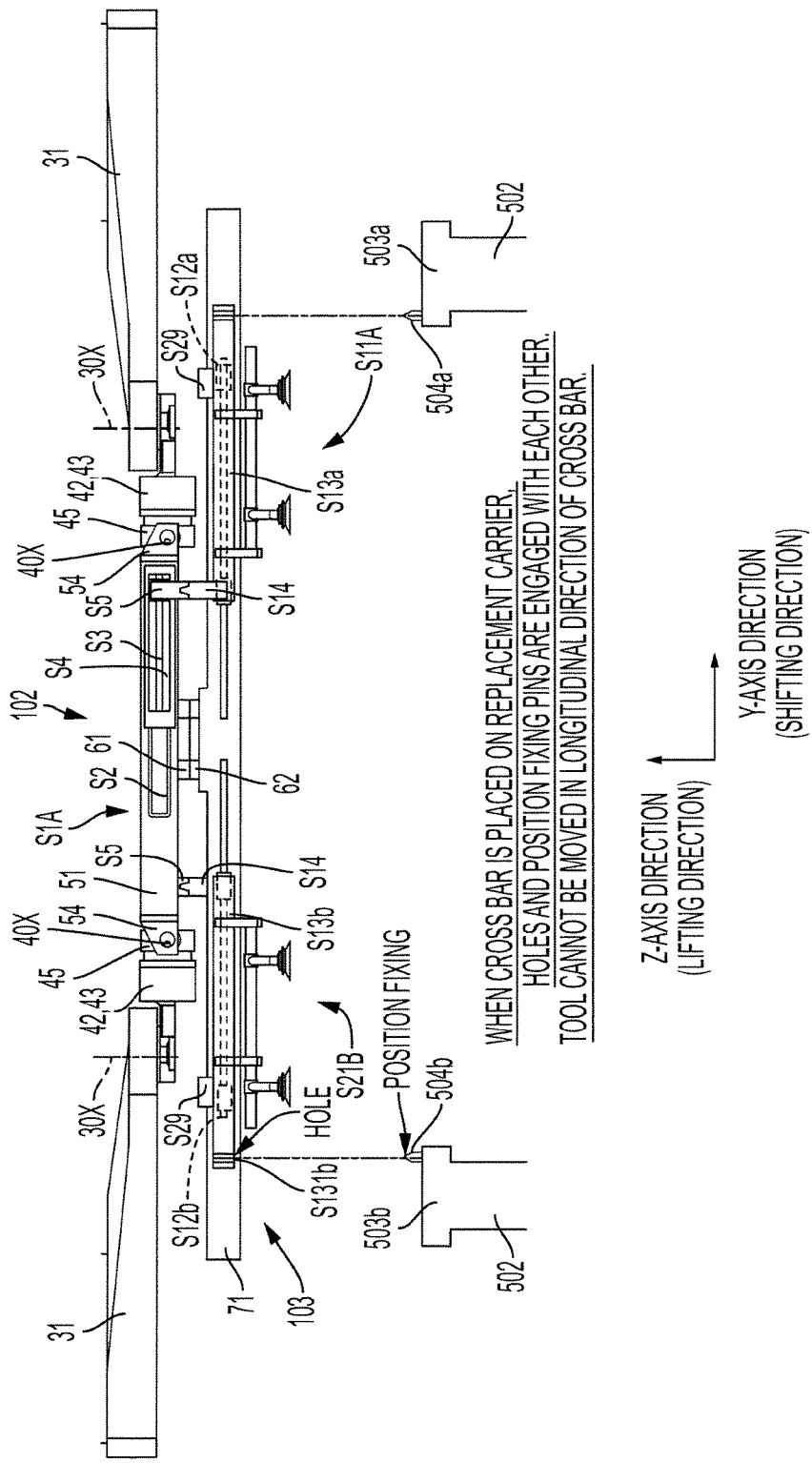
FIG. 14 is a front view for illustrating one example of a shifting direction positioning mechanism for the tool holders in the workpiece conveying apparatus according to the embodiment under a state before engagement of position fixing pins and engagement holes.

In this embodiment, as illustrated in FIG. 14, position fixing pins 504a and 504b protrude from upper surfaces of receiving stages 503a and 503b of the carrier 502 (also the carrier 5021), respectively, which are configured to receive and support the cross bar unit 103.

Meanwhile, the tool holders S13a and S13b of the cross bar unit 103 have engagement holes S131a and S131b, respectively, at positions corresponding to the position fixing pins 504a and 504b when the tool holders S13a and S13b take predetermined relative positions with respect to the cross bar 71, for example, a maximum separation position of the tool holders S13a and 13b on a near side in FIG. 14. The maximum separation position is a position under a state in which the tool holder S13a is at the rightmost position, and the tool holder S13b is at the leftmost position. The predetermined relative positions with respect to the cross bar 71 correspond to reference positions (predetermined rotation angle positions) of the servomotors S2.

Therefore, while the cross arm 102 and the cross bar unit 103 are brought to above the empty carrier 502 through operation of the workpiece conveying apparatus 1 as illustrated in FIG. 14 at the time of tool replacement (tool dismount), the servomotors S2 are driven at that time to move the tool holders S13a and S13b (see FIG. 7A, FIG. 7B, FIG. 8A, and FIG. 8B) to predetermined positions. When the cross arm 102 is lowered in that state to place the cross bar unit 103 on the receiving stages 503a and 503b of the carrier 502, the position fixing pins 504a and 504b on the carrier 502 side and the engagement holes S131a and S131b on the cross bar unit 103 side are engaged with each other. With this engagement, the cross bar unit 103 can be mounted to the carrier 502 under a state in which positions of the tool holders S13a and S13b and positions of the driven-side shifting members S14 are maintained at predetermined positions.

Figure 15:
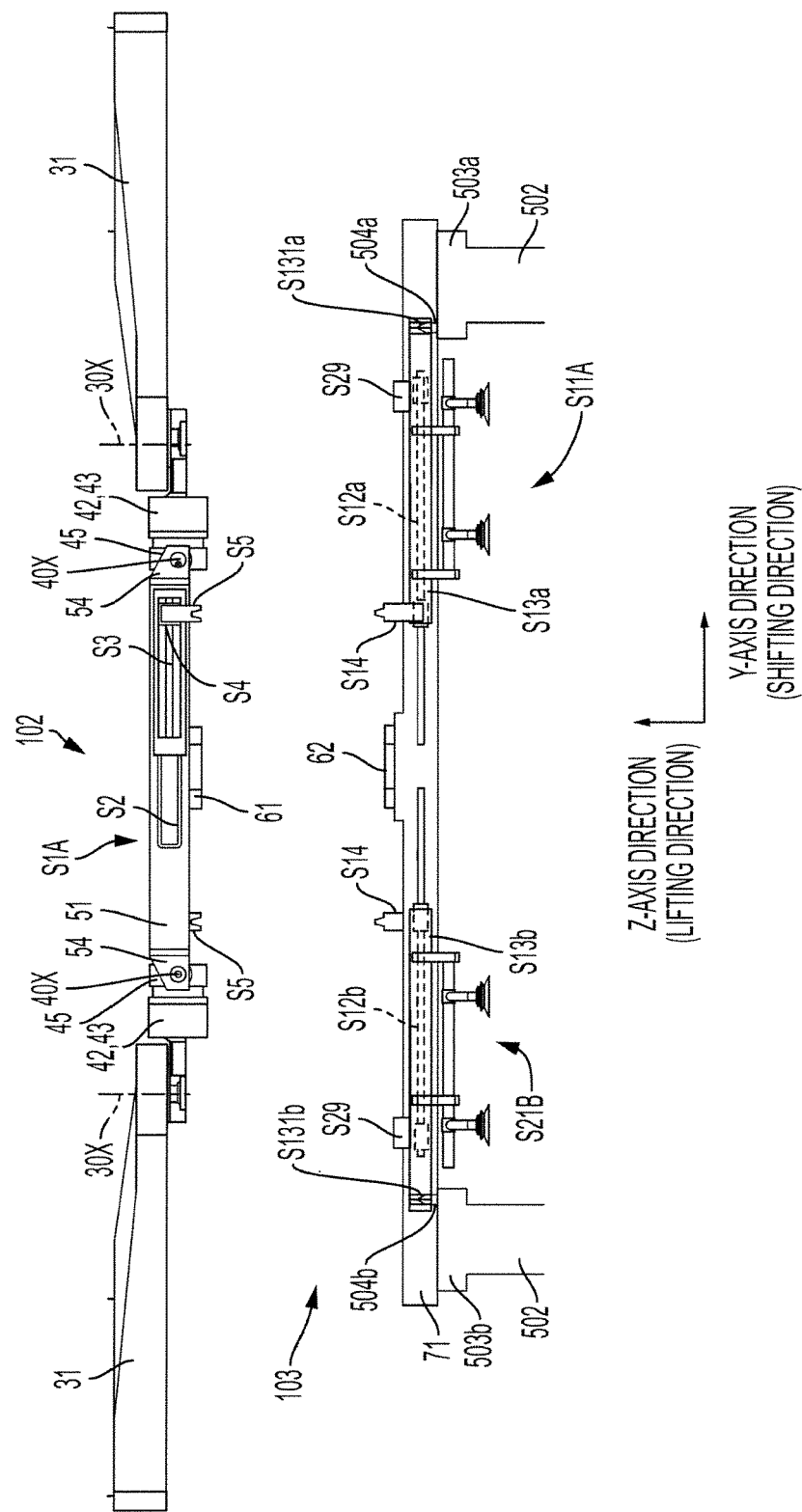
FIG. 15 is a front view for illustrating one example of the shifting direction positioning mechanism for the tool holders in the workpiece conveying apparatus according to the embodiment under a state during engagement of the position fixing pins and the engagement holes.
Figure 16:
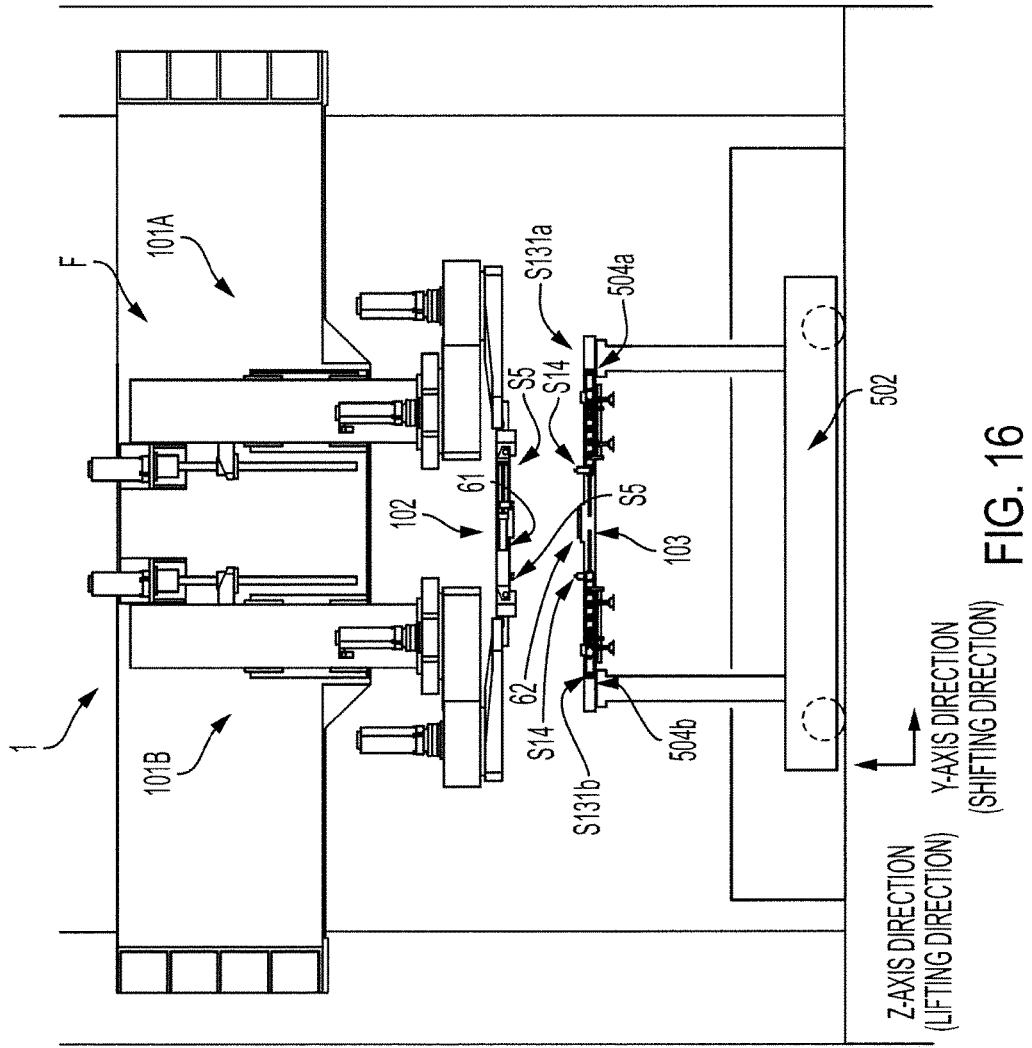
FIG. 16 is a front view for illustrating an overall configuration of one example of the shifting direction positioning mechanism for the tool holders in the workpiece conveying apparatus according to the embodiment under a state during engagement of the position fixing pins and the engagement holes.

At this time, when the supply of air from the coupler 61 side to the coupler 62 side is stopped, the engagement between the coupler 61 of the cross arm 102 and the coupler 62 of the cross bar unit 103 is automatically cancelled. When the cross arm 102 is raised through operation of the workpiece conveying apparatus 1, the cross bar unit 103 is detached (or dismounted) from the cross arm 102. Thus, only the cross bar unit 103 can be placed on the carrier 502 (see FIG. 15 and FIG. 16).

When the workpiece conveying apparatus 1 is operated to take the cross bar unit 103 next time, the tool holders S13a and S13b and the driven-side shifting members S14 are maintained at predetermined positions through the engagement of the position fixing pins 504a and 504b with the engagement holes S131a and S131b, and positions of the drive-side shifting members S5 corresponding to the predetermined positions, that is, the predetermined rotation angular amount of the servomotors S2 (amount of driving from the reference positions) are also known. Thus, through adjustment to those positions, the drive-side shifting members S5 and the driven-side shifting members S14 can easily be engaged, and the cross bar unit 103 can be connected automatically. Therefore, subsequent drive control for the servomotors S2 can be performed for continuous shifting movement without causing so-called step outs, which are, for example, mismatch and inconsistency between position information based on encoders of the servomotors S2 and position information of the tool holders S13a and S13b.

Further, in this embodiment, the servomotors S2 being the shifting movement drive sources are provided on the workpiece conveying apparatus 1 (cross arm 102) side. Thus, at the time of tool replacement, there is no need to detach the tool attachment parts, which include the shifting movement drive sources corresponding to the servomotors S2, from the workpiece conveying apparatus as in the related-art apparatus (Japanese Utility Model Application Laid-open No. Hei 4-113126). Further, the supply of power to the shifting movement drive sources corresponding to the servomotors S2 is continued. Thus, there is no fear in that position information of the shifting movement drive sources, for example, the servomotors is lost at each time of the tool replacement as in the related-art apparatus (Japanese Utility Model Application Laid-open No. Hei 4-113126).

That is, in the related-art apparatus (Japanese Utility Model Application Laid-open No. Hei 4-113126), when the servomotor side and the tool side are once detached from each other at the time of tool replacement, the original point setting work is required again at the time of reconnection so as to associate the position information on the servomotor side and the position information on the tool side. However, according to this embodiment, such original point setting work is not required. Thus, time for tool replacement can be reduced significantly.

The position fixing pins 504a and 504b and the engagement holes S131a and S131b correspond to one example of the shifting direction positioning mechanism in the workpiece conveying apparatus 1 according to the present invention.

Incidentally, the configuration of the position fixing pins 504a and 504b and the engagement holes S131a and S131b is not limited to the case illustrated in FIG. 14, and there may also employed a configuration of forming engagement holes on the carrier 502 side and forming position fixing pins protruding downward on the tool holders S13a and S13b side.

Figure 17:
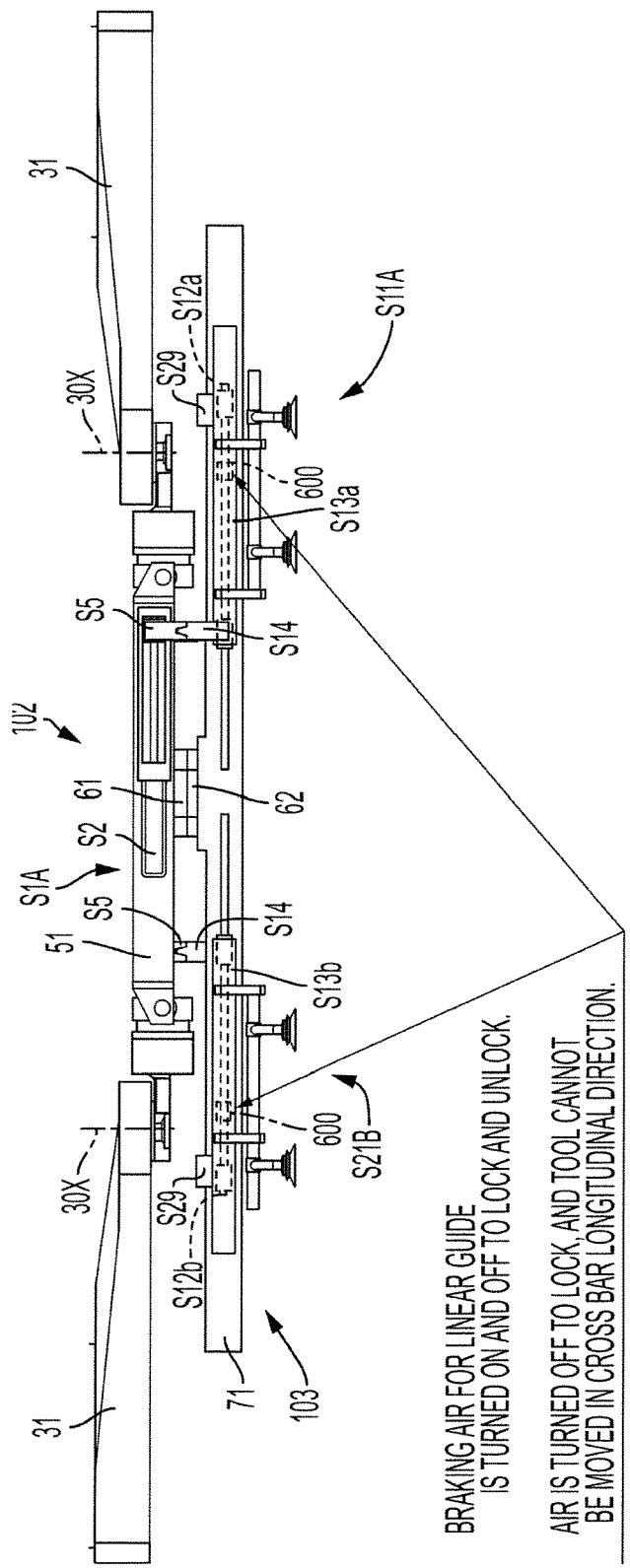
FIG. 17 is a front view for illustrating another one example of the shifting direction positioning mechanism for the tool holders in the workpiece conveying apparatus according to the embodiment, through use of a braking device.
Figure 18:
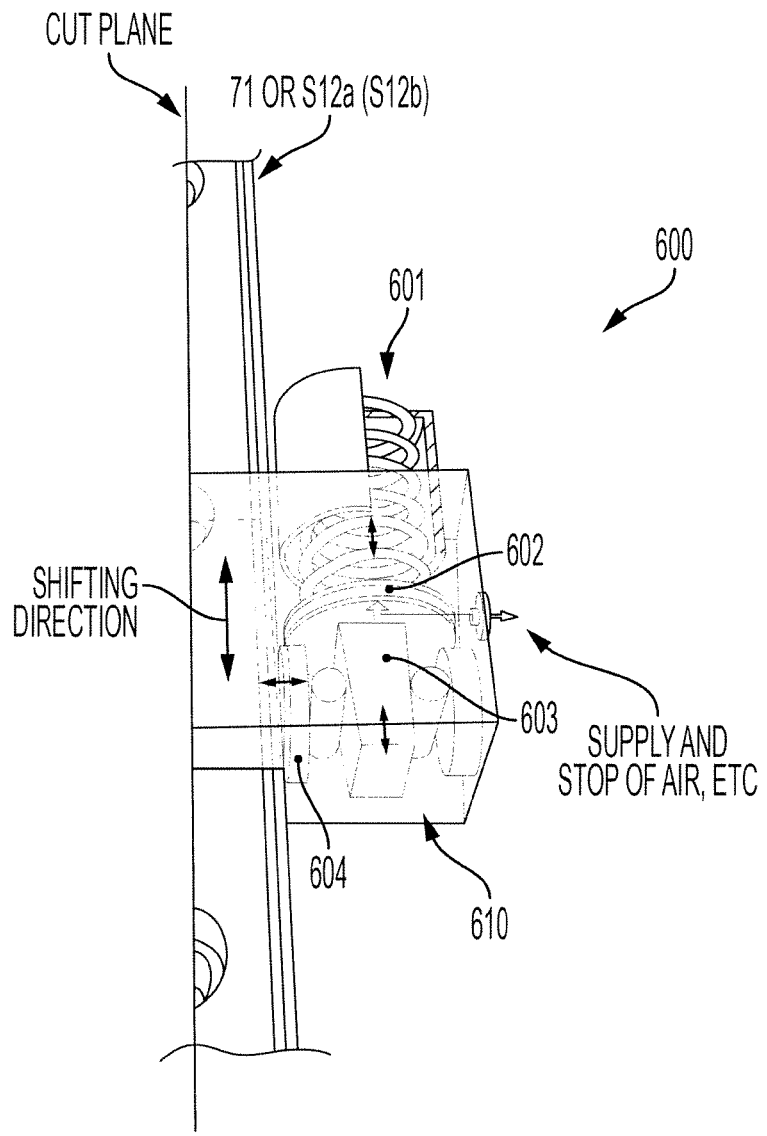
FIG. 18 is a sectional perspective view for illustrating one example of the shifting direction positioning mechanism (braking device) for the tool holders in the workpiece conveying apparatus according to the embodiment.

As another example of the shifting direction positioning mechanism, a braking device 600 as illustrated in FIG. 17 and FIG. 18 may be used.

The braking device 600 is provided for each of the tool holders S13a and S13b. A friction element 604 is brought into contact with or released from the cross bar 71 and the linear guide S12a, or the linear guide S12b so that the tool holders S13a and S13b can be fixed at and released from the crossbar 71, the linear guide S12a, or the linear guide S12b at a predetermined position in the longitudinal direction of the cross bar 71, the linear guide S12a, or the linear guide S12b.

For example, a linear clamp (product name "Linear Clamper-Zee" (trademark)) manufactured by NBK (Nabeya Bi-tech Kaisha) may be used as the braking device 600.

More in detail, as one example of the linear clamp 600 (one example of the breaking device), a piston 602 which is elastically urged downward in FIG. 18 by a spring 601 is provided in a linear clamp body 610 being a member which is substantially integral with the tool holders S13a and S13b. The linear clamp body 610 is slidable in a longitudinal direction (shifting direction) of the cross bar 71 or a rail of the linear guide S12a or S12b. A wedge element 603 having a tapered lower side in FIG. 18 is mounted to a back surface (lower side in FIG. 18) of the piston 602.

The friction element 604 is arranged on a left side of the wedge element 603 in FIG. 18 so as to face the cross bar 71 or the rail of the linear guide S12a or S12b. The friction element 604 approaches to and is separated from the cross bar 71 or the rail of the linear guide S12a or S12b in accordance with up-and-down movement of the wedge element 603.

That is, under a state in which air pressure or the like is not applied to the back surface of the piston 602, that is, a state in which the couplings 61 and 62 are separated apart, the piston 602 is pressed by the spring 601 to be elastically urged downward in FIG. 18. At this time, the wedge element 603 located below the piston 602 also moves downward in FIG. 18 in conjunction with the piston 602. Thus, a thick portion of the wedge element 603 on the proximal end side (the upper side in FIG. 18) causes the friction element 604 to be pushed toward the cross bar 71 side to be brought into abutment thereagainst. As a result, a frictional force is generated between the friction element 604 and the cross bar 71 or the linear guide S12a or S12b, and the linear clamp body 610 being a member which is substantially integral with the tool holders S13a and S13b is fixed and held with respect to the cross bar 71.

Therefore, at the time of tool replacement (tool dismount), before the coupling 61 and the coupling 62 are detached from each other, the servomotors S2 are driven to move the tool holders S13a and S13b to predetermined positions. In that state, when the cross arm 102 is lowered to place the cross bar unit 103 on the receiving stages of the carrier 502, and the coupling 61 and the coupling 62 are detached from each other, the supply of air is stopped. Then, the tool holders S13a and S13b (driven-side shifting members S14) are fixed and held by the braking device 600 at predetermined positions with respect to the cross bar 71.

Meanwhile, at the time of mounting the tool to the empty cross arm 102, when the servomotors S2 are driven to move the drive-side shifting members S5 to positions corresponding to the predetermined positions of the tool holders S13a and S13b (driven-side shifting members S14), and the cross arm 102 is brought close to the cross bar unit 103 to connect the coupling 61 and the coupling 62 to each other, the supply of air is started. Thus, the braking device 600 fixed and held by the friction element 604 is released so that the tool holders S13a and S13b are freely movable with respect to the cross bar 71. Therefore, subsequent drive control for the servomotors S2 can be performed for continuous shifting movement without causing so-called step outs, which are mismatch and inconsistency between position information based on encoders of the servomotors S2 and position information of the tool holders S13a and S13b.

The tool holders S13a and S13b are substantially integrally connected through intermediation of the bridge (connection member) S29. Thus, the braking device 600 may be provided to at least one of the tool holder S13a of the sliding devices S11A and S11B or the tool holder S13b of the slave-side sliding devices S21A and S21B.

Now, basic workpiece conveying operations of the workpiece conveying apparatus 1 according to this embodiment are described.

<Workpiece Conveying Operations of Moving Workpiece in X-Axis Direction (Workpiece Conveying Direction) and Moving Workpiece in Z-Axis Direction (Height Direction or Up-and-Down Direction)>

<Step 1>

In Step 1, as illustrated in FIG. 4A, when the workpiece W is conveyed to a subsequent step, for example, when the workpiece W is carried into or out of a press machine, the servomotors (13 and 22) of each of the SCARA robots 101A and 101B are driven to rotate and actuate the first arm 21 and the second arm 31. Thus, the cross bar unit 103 is moved to a position above the workpiece W to be conveyed, for example, the workpiece on a conveyor or on a die of a press machine for a preceding step.

At this stage or prior to this stage, the servomotors 2 are driven in synchronization with each other so as to lower the SCARA robots 101A and 101B in synchronization with each other, thereby bringing a drawing section (suction cups 81B) of each of the grasping tools 81 arranged on the cross bar 71 into close contact with an upper surface of the workpiece W.

In this state, the workpiece W is drawn and held on the drawing section due to an action of a drawing force of the drawing section (suction cups 81B) of each of the grasping tools 81, for example, an action of drawing the workpiece W by negative pressure or attracting the workpiece W by magnetism.

The workpiece W drawn on the grasping tools 81 is lifted up along with raising of the entire robots 101A and 101B by the servomotors 2.

<Step 2>

In Step 2, the workpiece W, which has been lifted up in Step 1 owing to actions of the first arm 21 and the second arm 31 of each of the robots 101A and 101B, the servomotors 13 and 22 of each of the robots 101A and 101B, and the like, is conveyed to a downstream in the workpiece conveying direction which is the X-axis direction (see FIG. 4B, FIG. 4C, and FIG. 4D in the stated order).

<Step 3>

As illustrated in FIG. 4E, the workpiece W has been conveyed to above a position to which the workpiece W is to be conveyed. Thus, in Step 3, the servomotors 13 and 22 and the like are stopped to stop movement of the first arms 21 and the second arms 31, whereas the entire robots 101A and 101B are lowered by the servomotors 2.

<Step 4>

In Step 4, the drawing force of the drawing section of each of the grasping tools 81 mounted to the cross bar 71 is canceled, thereby releasing the workpiece W. In this manner, conveyance of the workpiece is completed.

After conveyance of the workpiece W is completed, the grasping tools 81 are raised. The raising is performed by raising the robots 101A and 101B by the servomotors 2 in synchronization with each other.

After that, owing to the actions of the first arm 21 and the second arm 31 of each of the robots 101A and 101B, the servomotors 13 and 22 of each of the robots 101A and 101B, and the like, the cross bar 71 and the grasping tools 81 are moved to above a position at which a workpiece W to be conveyed next is placed. Specifically, returning operations from the state illustrated in FIG. 4E to the state illustrated in FIG. 4A are performed. In other words, operations are performed in the order reverse to that indicated by the arrows of FIG. 4A to FIG. 4E.

Through repetition of the series of the operations afterward, the workpiece is sequentially conveyed to downstream steps.

<Operation of Causing Workpiece to Rotate about X-Axis (or Roll)>

When a die is placed obliquely, for example, when it is desired that a punch be driven into the workpiece exactly along a thickness direction of the workpiece in view of quality of a finished product, specifically, in view of an appearance of a punched hole, it is necessary to cause the grasped workpiece W to incline within the YZ plane or in the height direction, for example, to cause the grasped workpiece W to rotate about the X-axis (or roll). The workpiece conveying apparatus 1 according to this embodiment can meet such necessity.

Figure 21:
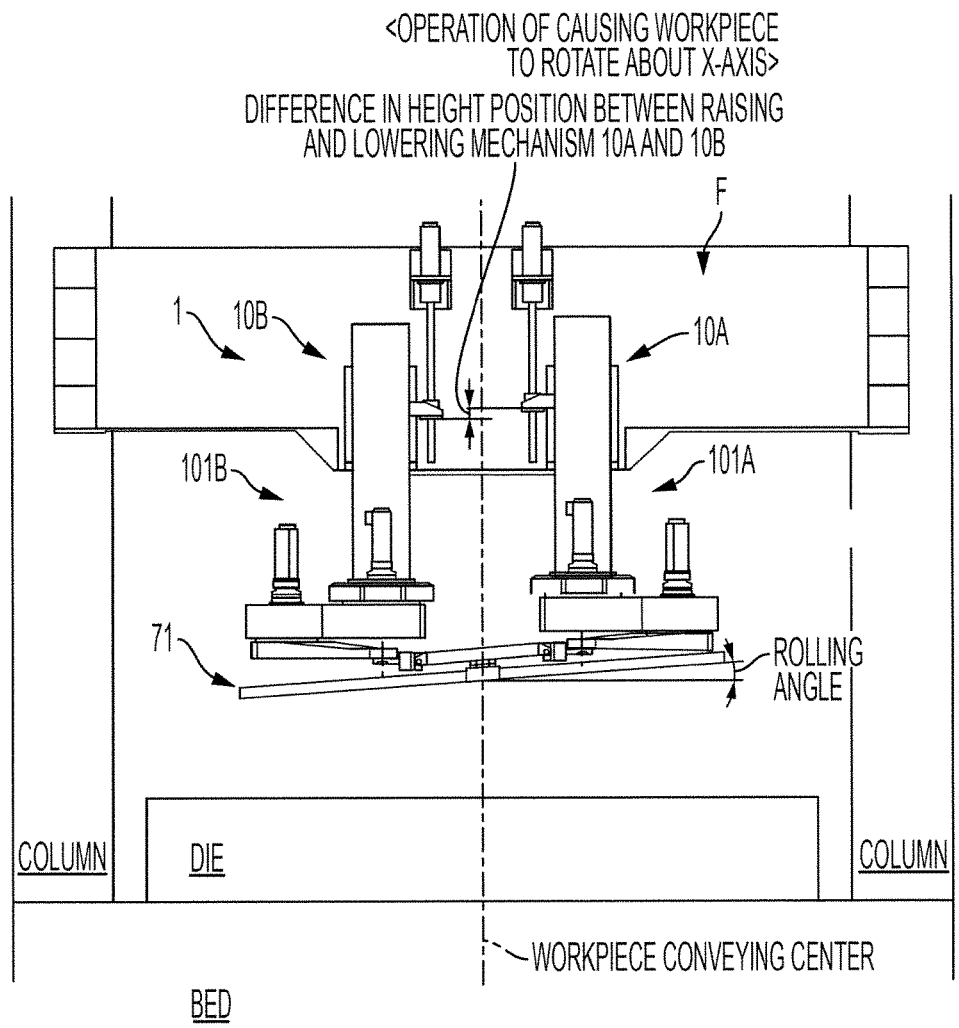
FIG. 21 is a plan view for illustrating a state in which the cross bar (workpiece) is caused to rotate about an X-axis (or roll) in the workpiece conveying apparatus according to the embodiment.
Figure 22B:
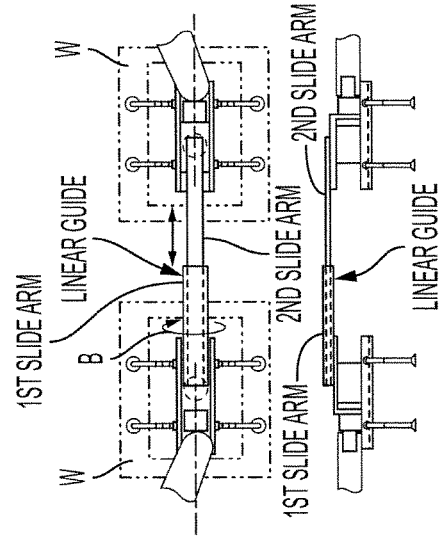
FIG. 22B is a view for illustrating a problem that arises in the apparatus of FIG. 22A.
Figure 22A:
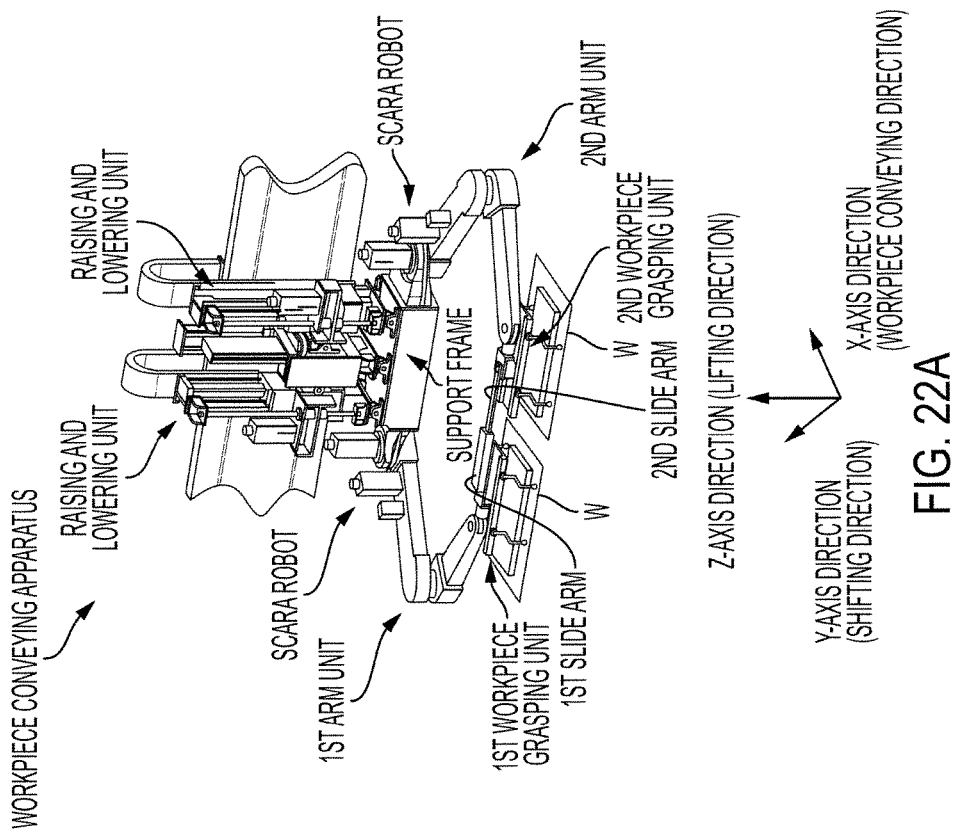
FIG. 22A is a perspective view for illustrating a related-art workpiece conveying apparatus.

That is, as illustrated in FIG. 21, the servomotors 2 for the right and left robots 101A and 101B are mutually independently controlled, that is, controlled so as to move the robots 101A and 101B to positions different in height, thereby being capable of inclining the cross bar 71 and the grasping tools 81 within the YZ plane. Under the state in which the cross bar 71 and the grasping tools 81 are inclined, the right and left robots 101A and 101B are lowered, thereby being capable of placing the workpiece on a die that is arranged obliquely.

<Operation of Causing Workpiece to Rotate about Y-Axis (or Pitch or Tilt)>

Further, the workpiece conveying apparatus 1 according to this embodiment can meet such a necessity to cause the cross bar 71 and the grasped workpiece W to rotate about the Y-axis (or tilt or pitch).

Figure 5:
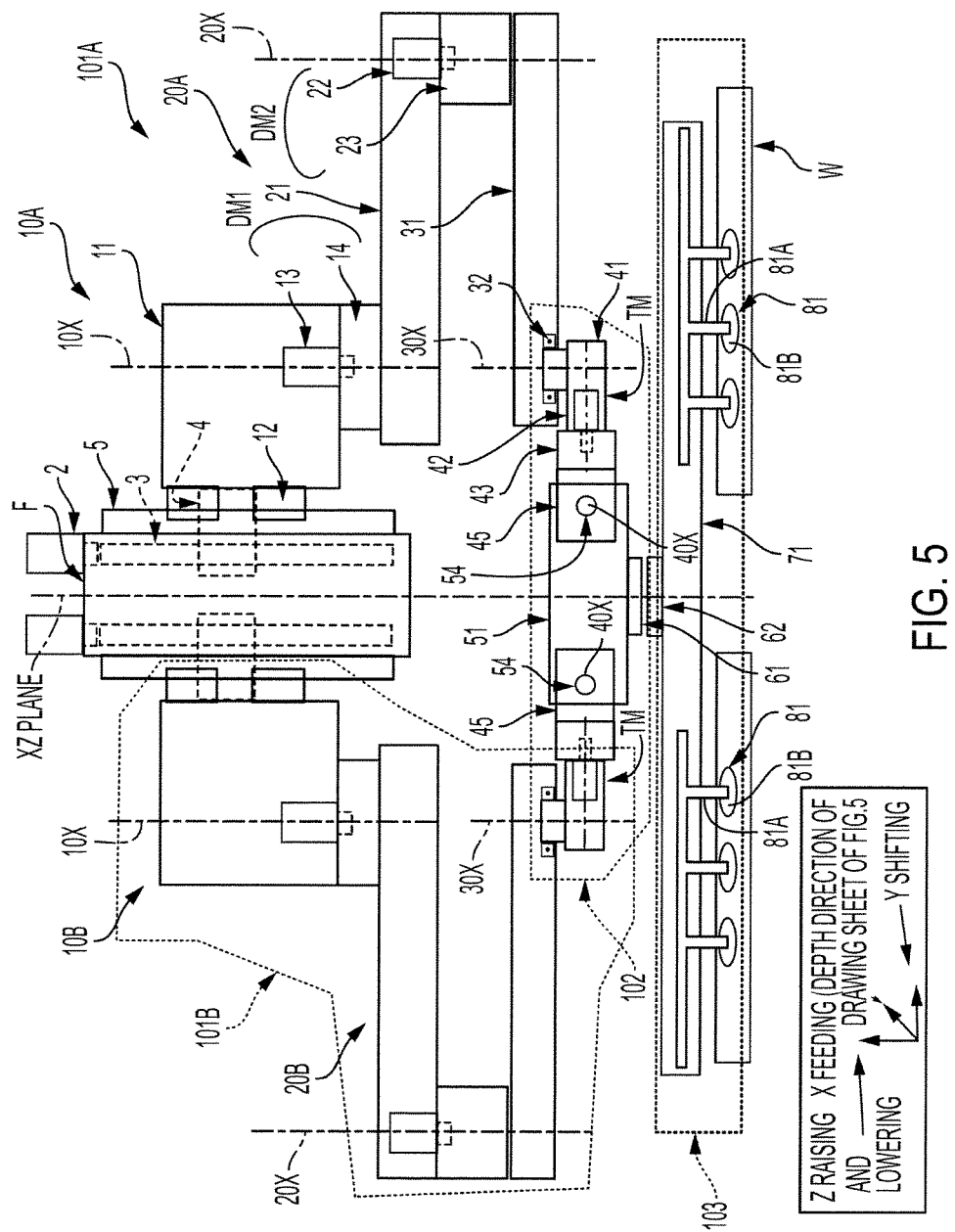
FIG. 5 is a front view for illustrating details of a configuration example of the workpiece conveying apparatus according to the embodiment.

That is, as illustrated in FIG. 5, through driving of each tilting mechanism TM, which includes the servomotor 42, the speed reducer 43, and the like and is arranged between the distal end of the second arm 31 and the holder 45 mounted at each end of the cross arm 102, the workpiece W, the center arm 51, the cross bar 71, and the grasping tools 81 can be rotated about the Y-axis which is the shifting axis (or tilted).

<Operation of Causing Workpiece to Rotate about Z-Axis (or Yaw)>

Further, the workpiece conveying apparatus 1 according to this embodiment can meet such a necessity to cause the cross bar 71 and the grasped workpiece W to rotate about the Z-axis (or yaw) within the horizontal plane, that is, within the XY plane.

Figure 20:
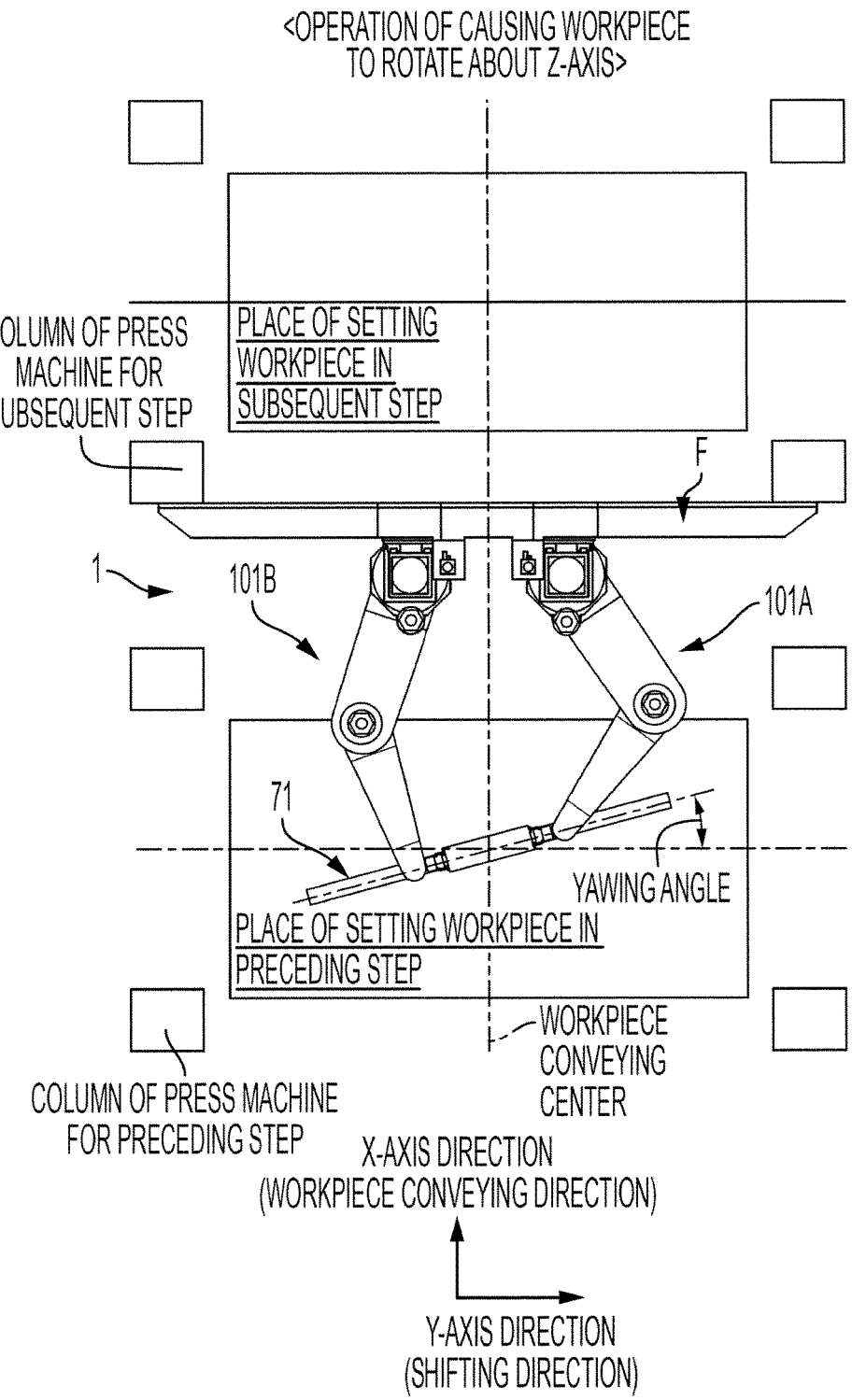
FIG. 20 is a plan view for illustrating a state in which the cross bar (workpiece) is caused to rotate about a Z-axis (or yaw) in the workpiece conveying apparatus according to the embodiment.

That is, as illustrated in FIG. 20, movement of the arm units 20A and 20B of the right and left robots 101A and 101B, each of which includes the first arm 21 and the second arm 31, is mutually independently controlled, that is, the first arm driving mechanism DM1 and the second arm driving mechanism DM2 of each of the arm units 20A and 20B are controlled so that rotation angle positions of the first joints 10X and the second joints 20X differ from one another. In this manner, the cross bar 71 and the grasping tools 81 can be rotated about the Z-axis.

<Operation of Causing Workpiece to Move in Y-Axis Direction (or Shift)>

In addition, the workpiece conveying apparatus 1 according to this embodiment can meet such a need to cause the cross bar 71 and the grasped workpiece W to move (or shift) in the lateral direction, specifically, the Y-axis direction or the width direction orthogonal to the workpiece conveying direction, which is the X-axis direction.

Figure 19:
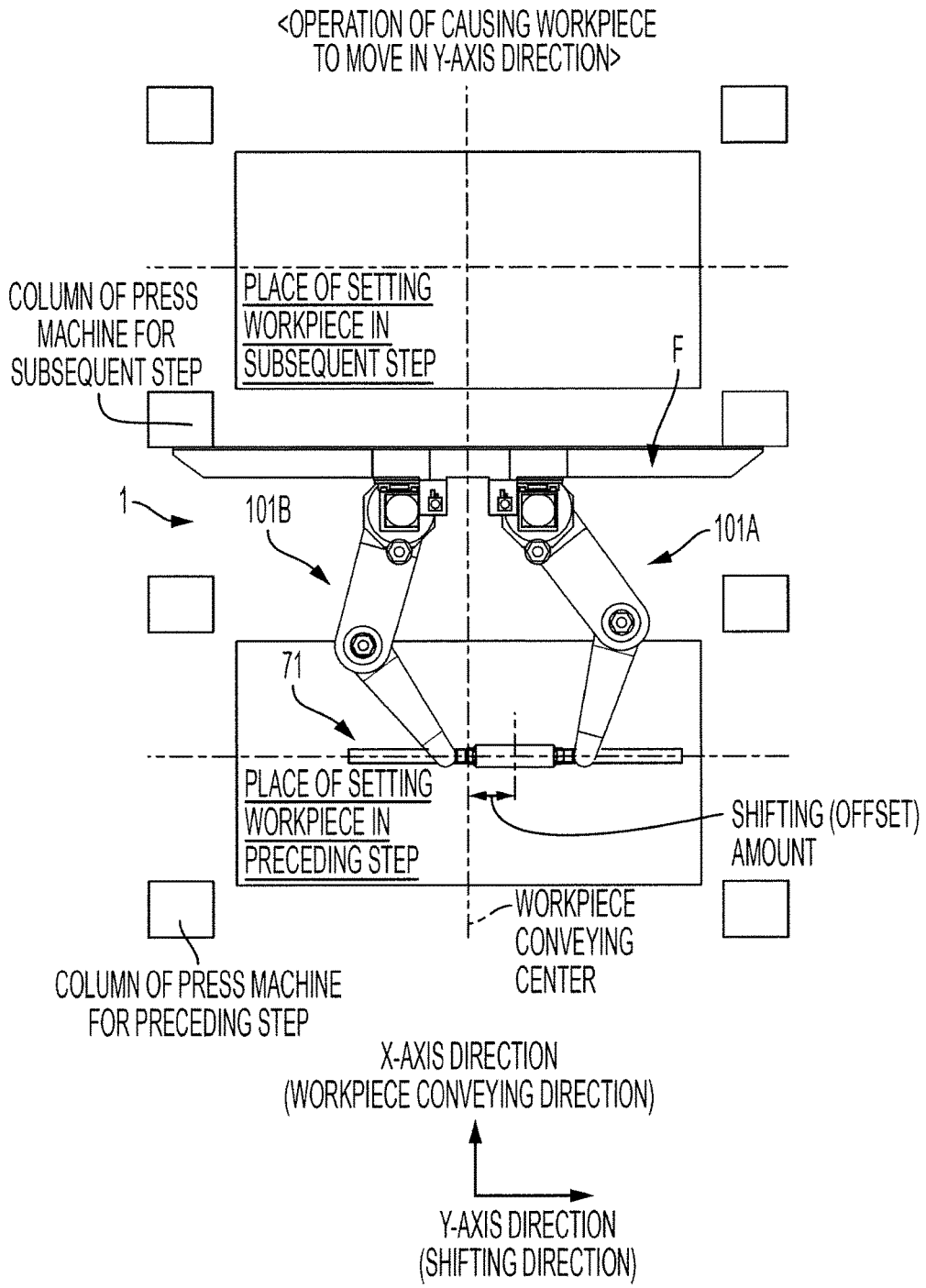
FIG. 19 is a plan view for illustrating a state in which the cross bar (workpiece) is caused to move (or shift) in a Y-axis direction in the workpiece conveying apparatus according to the embodiment.

That is, as illustrated in FIG. 19, movement of the arm units 20A and 20B of the right and left robots 101A and 101B, each of which includes the first arm 21 and the second arm 31, is mutually independently controlled, that is, the first arm driving mechanism DM1 and the second arm driving mechanism DM2 of each of the arm units 20A and 20B are controlled so that rotation angle positions of the first joints 10X and the second joints 20X differ from one another. In this manner, the cross bar 71 and the grasping tools 81 can be moved (or shifted) in the lateral direction, which is the Y-axis direction, orthogonal to the workpiece conveying direction which is the X-axis direction.

In the description above, the cross arm 102 is connected to the distal end of each second arm 31 through intermediation of the third joint 30X that corresponds to a vertical pivot axis, that is, a pivot axis extending along the Z-axis. Further, in order to enable the cross arm 102 to rotate about the X-axis (or roll), each end of the center arm 51 and the bracket 41, which is connected to the second arm 31 so as to be freely rotatable about the third joint, are connected together through intermediation of the bearing 54 (fourth joint 40X) that is freely rotatable about the X-axis.

As described above, the workpiece conveying apparatus 1 according to this embodiment not only can convey the workpiece in the workpiece conveying direction which is the X-axis direction, but also can cause the workpiece to rotate about the X-axis (or roll), rotate about the Y-axis (or tilt), rotate about the Z-axis (or yaw), move in the Z-axis direction (or lift), and move in the Y-axis direction (or shift).

That is, in the workpiece conveying apparatus 1 according to this embodiment, it is possible to provide the workpiece conveying apparatus for a pressing machine capable of, with the relatively simple, low-cost, lightweight, and compact configuration, changing the conveyance posture of the workpiece with the high degree of freedom.

The shifting device and the sliding device in the workpiece conveying apparatus 1 according to the present invention are not limited for use in the case where the conveying robots 101A and 101B in the workpiece conveying apparatus 1 according to this embodiment are configured to be movable mutually independently in the up-and-down direction (Z-axis direction). For example, the shifting device and the sliding device are also applicable to, for example, the workpiece conveying apparatus as disclosed in Japanese Patent No. 5274053, specifically, the workpiece conveying apparatus having a configuration in which two SCARA robots are supported on a common support frame.

The embodiment described above is merely an example for describing the present invention, and various modifications may be made without departing from the gist of the present invention.

What is claimed is:

1. A workpiece conveying apparatus for a pressing machine, comprising:
    two robots each comprising:
    a raising and lowering frame supported on a stationary frame so as to be movable in a Z-axis direction being an up-and-down direction, the stationary frame being mounted to extend along a Y-axis direction that is a width direction orthogonal to an X-axis direction being a workpiece conveying direction of a passage space for conveying a workpiece;
    a first arm supported at a proximal end side thereof on the raising and lowering frame through a first joint so as to be freely rotatable within a horizontal plane;
    a second arm supported at a proximal end side thereof on a distal end side of the first arm through a second joint so as to be freely rotatable within the horizontal plane;
    a first arm driving mechanism configured to drive the first arm to rotate about the first joint with respect to the raising and lowering frame; and
    a second arm driving mechanism configured to drive the second arm to rotate about the second joint with respect to the first arm;
    a raising and lowering mechanism configured to enable the two robots to move in the Z-axis direction;
    a cross arm configured to couple distal ends of second arms of the two robots so as to be freely rotatable within the horizontal plane through a third joint;
    a workpiece holding unit removably connected to the cross arm and configured to releasably hold the workpiece through a tool holder;
    a shifting device mounted to the cross arm and configured to move, by a shifting movement drive source, a drive-side shifting member linearly along a longitudinal direction of the cross arm relative to the cross arm; and
    a sliding device mounted to the workpiece holding unit and configured to move, under a state in which the workpiece holding unit is connected to the cross arm, the tool holder in a Y-axis direction by an operation of causing a driven-side shifting member corresponding to the drive-side shifting member to be driven by the drive-side shifting member.

2. The workpiece conveying apparatus for a pressing machine according to claim 1,
    wherein the tool holder comprises a plurality of tool holders arranged along the Y-axis direction, and the sliding device comprises a plurality of sliding devices provided so as to correspond to the plurality of tool holders, respectively, and
    wherein the shifting device comprises a plurality of shifting devices provided so as to correspond to the plurality of sliding devices, respectively.

3. The workpiece conveying apparatus for a pressing machine according to claim 1, further comprising a shifting direction positioning mechanism configured to hold a relative position of the tool holder with respect to the workpiece holding unit at a predetermined position when the workpiece holding unit is detached from the cross arm.

4. The workpiece conveying apparatus for a pressing machine according to claim 1, wherein the cross arm is further configured to carry out a lowering movement where a first coupler on a side of the cross arm is brought close to and engaged with a second coupler on a side of a cross bar unit and facing the first coupler, the drive-side shifting member is engaged with the driven-side shifting member, and the first and second couplers are automatically attached.

5. A workpiece conveying apparatus for a pressing machine, comprising:
    two robots arranged symmetrically with respect to an XZ plane passing a workpiece conveying center, each of the two robots comprising:
    a raising and lowering frame supported on a stationary frame so as to be movable in a Z-axis direction being an up-and-down direction, the stationary frame being mounted to extend along a Y-axis direction that is a width direction orthogonal to an X-axis direction being a workpiece conveying direction of a passage space for conveying a workpiece;
    a first arm supported at a proximal end side thereof on the raising and lowering frame through a first joint so as to be freely rotatable within a horizontal plane;
    a second arm supported at a proximal end side thereof on a distal end side of the first arm through a second joint so as to be freely rotatable within the horizontal plane;
    a first arm driving mechanism configured to drive the first arm to rotate about the first joint with respect to the raising and lowering frame; and
    a second arm driving mechanism configured to drive the second arm to rotate about the second joint with respect to the first arm;
    two raising and lowering mechanisms arranged to correspond to the two robots, respectively, and configured to enable the corresponding raising and lowering frames to mutually independently move in the Z-axis direction, so that the two robots moves in the up-and-down direction independently of each other with respect to the stationary frame;
    a cross arm configured to couple distal ends of second arms arranged on both sides across the XZ plane so as to be freely rotatable within the horizontal plane through a third joint and freely rotatable within a vertical plane through a fourth joint with the plane of rotation of the first and second arms kept in the horizontal plane; and
    a workpiece holding unit connected to the cross arm and configured to releasably hold the workpiece through a tool holder;

a shifting device mounted to the cross arm and configured to move, by a shifting movement drive source, a drive-side shifting member linearly along a longitudinal direction of the cross arm relative to the cross arm; and a sliding device mounted to the workpiece holding unit and configured to move, under state in which the workpiece holding unit is connected to the cross arm, the tool holder in a Y-axis direction by an operation of causing a driven-side shifting member corresponding to the drive-side shifting member to be driven by the drive-side shifting member.

\* \* \* \* \*